US012621448B2

(12) United States Patent
Jang et al.

(10) Patent No.: US 12,621,448 B2
(45) **Date of Patent: *May 5, 2026**

(54) METHOD AND APPARATUS FOR ENCODING/DECODING IMAGE, FOR PERFORMING DEBLOCKING FILTERING BY DETERMINING BOUNDARY STRENGTH, AND METHOD FOR TRANSMITTING BITSTREAM

(71) Applicant: GUANGDONG OPPO MOBILE TELECOMMUNICATIONS CORP., LTD., Dongguan (CN)

(72) Inventors: Hyeong Moon Jang, Seoul (KR); Sangheon Lee, Seoul (KR)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 10 days.

This patent is subject to a terminal disclaimer.

(21) Appl. No.: 18/765,937

(22) Filed: Jul. 8, 2024

(65) Prior Publication Data

US 2024/0364881 A1 Oct. 31, 2024

Related U.S. Application Data

(63) Continuation of application No. 18/206,499, filed on Jun. 6, 2023, now Pat. No. 12,069,255, which is a
(Continued)

(51) Int. Cl.
*H04N 19/00* (2014.01)
*H04N 19/117* (2014.01)
(Continued)

(52) U.S. Cl.
CPC ......... *H04N 19/117* (2014.11); *H04N 19/132* (2014.11); *H04N 19/186* (2014.11); *H04N 19/46* (2014.11); *H04N 19/80* (2014.11)

(58) Field of Classification Search
None
See application file for complete search history.

(56) References Cited

U.S. PATENT DOCUMENTS

2006/0126962 A1 6/2006 Sun
2010/0208806 A1* 8/2010 Yu .......................... H04N 19/91
375/E7.243
(Continued)

FOREIGN PATENT DOCUMENTS

CN 109246429 1/2019

OTHER PUBLICATIONS

DGIP, Office Action for ID Application No. P00202211796, Oct. 31, 2024.
CNIPA, First Office Action for CN Application No. 202510299695.6, Nov. 20, 2025.
CNIPA, First Office Action for CN Application No. 202510299692.2, Jan. 20, 2026.
(Continued)

*Primary Examiner* — Zhihan Zhou
(74) *Attorney, Agent, or Firm* — Hodgson Russ LLP

(57) ABSTRACT

An image encoding/decoding method and apparatus are provided. An image decoding method according to the present disclosure may comprise obtaining a reconstructed picture, determining a target boundary of deblocking filtering in the reconstructed picture, determining a boundary strength for the target boundary, and applying deblocking filtering to the target boundary based on the boundary strength. Based on the target boundary being a transform block boundary and a color component of the reconstructed picture being a chroma component, the boundary strength may be determined based on whether joint CbCr residual coding is performed on at least one of two blocks adjacent to the target boundary, and the joint CbCr residual coding may correspond to encoding residual samples for a chroma Cb component and a chroma Cr component as a single transform block.

14 Claims, 12 Drawing Sheets

Related U.S. Application Data continuation of application No. 17/914,492, filed as application No. PCT/KR2021/003309 on Mar. 17, 2021, now Pat. No. 11,818,341.

(60) Provisional application No. 62/994,831, filed on Mar. 25, 2020.

(51) Int. Cl.
| | |
|---|---|
| *H04N 19/132* | (2014.01) |
| *H04N 19/186* | (2014.01) |
| *H04N 19/46* | (2014.01) |
| *H04N 19/80* | (2014.01) |

(56) References Cited

U.S. PATENT DOCUMENTS

| | | | | |
|---|---|---|---|---|
| 2014/0204999 | A1* | 7/2014 | Park | H04N 19/61 |
| | | | | 375/240.02 |
| 2014/0369428 | A1* | 12/2014 | Park | H04N 19/82 |
| | | | | 375/240.29 |
| 2016/0100163 | A1* | 4/2016 | Rapaka | H04N 19/182 |
| | | | | 375/240.16 |
| 2022/0224886 | A1* | 7/2022 | Tsai | H04N 19/117 |

* cited by examiner

| transform_unit( x0, y0, tbWidth, tbHeight, treeType, subTuIndex, chType ) { | Descriptor |
|---|---|
| ... | |
|    tu_cb_coded_flag[ xC ][ yC ] | ae(v) |
|    tu_cr_coded_flag[ xC ][ yC ] | ae(v) |
| | |
|     tu_y_coded_flag[ x0 ][ y0 ] | ae(v) |
| ... | |
|   if( sps_joint_cbcr_enabled_flag && ( ( CuPredMode[ chType ][ x0 ][ y0 ] == MODE_INTRA | |
|     && ( tu_cb_coded_flag[ xC ][ yC ] \|\| tu_cr_coded_flag[ xC ][ yC ] ) ) \|\| | |
|     ( tu_cb_coded_flag[ xC ][ yC ] && tu_cr_coded_flag[ xC ][ yC ] ) ) && | |
|     chromaAvailable ) | |
| | |
|     tu_joint_cbcr_residual_flag[ xC ][ yC ] | ae(v) |
|   if( tu_y_coded_flag[ x0 ][ y0 ] && treeType != DUAL_TREE_CHROMA ) { | |
|     if( sps_transform_skip_enabled_flag && !BdpcmFlag[ x0 ][ y0 ][ 0 ] && | |
|      tbWidth <= MaxTsSize && tbHeight <= MaxTsSize && | |
|      ( IntraSubPartitionsSplitType == ISP_NO_SPLIT ) && !cu_sbt_flag ) | |
|      transform_skip_flag[ x0 ][ y0 ][ 0 ] | ae(v) |
|     if( !transform_skip_flag[ x0 ][ y0 ][ 0 ] \|\| slice_ts_residual_coding_disabled_flag ) | |
|      residual_coding( x0, y0, Log2( tbWidth ), Log2( tbHeight ), 0 ) | |
|     else | |
|      residual_ts_coding( x0, y0, Log2( tbWidth ), Log2( tbHeight ), 0 ) | |
|   } | |
|   if( tu_cb_coded_flag[ xC ][ yC ] && treeType != DUAL_TREE_LUMA ) { | |
|     if( sps_transform_skip_enabled_flag && !BdpcmFlag[ x0 ][ y0 ][ 1 ] && | |
|      wC <= MaxTsSize && hC <= MaxTsSize && !cu_sbt_flag ) | |
|      transform_skip_flag[ xC ][ yC ][ 1 ] | ae(v) |
|     if( !transform_skip_flag[ xC ][ yC ][ 1 ] \|\| slice_ts_residual_coding_disabled_flag ) | |
|      residual_coding( xC, yC, Log2( wC ), Log2( hC ), 1 ) | |
|     else | |
|      residual_ts_coding( xC, yC, Log2( wC ), Log2( hC ), 1 ) | |
|   } | |
|   if( tu_cr_coded_flag[ xC ][ yC ] && treeType != DUAL_TREE_LUMA && | |
|     !( tu_cb_coded_flag[ xC ][ yC ] && tu_joint_cbcr_residual_flag[ xC ][ yC ] ) ) { | |
|     if( sps_transform_skip_enabled_flag && !BdpcmFlag[ x0 ][ y0 ][ 2 ] && | |
|      wC <= MaxTsSize && hC <= MaxTsSize && !cu_sbt_flag ) | |
|      transform_skip_flag[ xC ][ yC ][ 2 ] | ae(v) |
|     if( !transform_skip_flag[ xC ][ yC ][ 2 ] \|\| slice_ts_residual_coding_disabled_flag ) | |
|      residual_coding( xC, yC, Log2( wC ), Log2( hC ), 2 ) | |
|     else | |
|      residual_ts_coding( xC, yC, Log2( wC ), Log2( hC ), 2 ) | |
|   } | |
| } | |

FIG. 8

METHOD AND APPARATUS FOR ENCODING/DECODING IMAGE, FOR PERFORMING DEBLOCKING FILTERING BY DETERMINING BOUNDARY STRENGTH, AND METHOD FOR TRANSMITTING BITSTREAM

CROSS-REFERENCE TO RELATED APPLICATIONS

This application is a continuation of U.S. application Ser. No. 18/206,499, filed on Jun. 6, 2023, which is a continuation of U.S. application Ser. No. 17/914,492, filed on Sep. 26, 2022, which is a U.S. National Stage Entry of International Application No. PCT/KR2021/003309, filed on Mar. 17, 2021, which claims the benefit of U.S. Provisional Application No. 62/994,831, filed on Mar. 25, 2020. The entire disclosures of the aforementioned applications are incorporated herein by reference.

TECHNICAL FIELD

The present disclosure relates to an image encoding/decoding method and apparatus and, more particularly, to an image encoding/decoding method and apparatus for performing deblocking filtering by determining a boundary strength and a method of transmitting a bitstream generated by the image encoding method/apparatus of the present disclosure.

BACKGROUND ART

Recently, demand for high-resolution and high-quality images such as high definition (HD) images and ultra high definition (UHD) images is increasing in various fields. As resolution and quality of image data are improved, the amount of transmitted information or bits relatively increases as compared to existing image data. An increase in the amount of transmitted information or bits causes an increase in transmission cost and storage cost.

Accordingly, there is a need for high-efficient image compression technology for effectively transmitting, storing and reproducing information on high-resolution and high-quality images.

DISCLOSURE

Technical Problem

An object of the present disclosure is to provide an image encoding/decoding method and apparatus with improved encoding/decoding efficiency.

Another object of the present disclosure is to provide an image encoding/decoding method and apparatus for performing deblocking filtering.

Another object of the present disclosure is to provide an image encoding/decoding method and apparatus for determining a boundary strength of deblocking filtering in order to perform deblocking filtering.

Another object of the present disclosure is to provide a method of transmitting a bitstream generated by an image encoding method or apparatus according to the present disclosure.

Another object of the present disclosure is to provide a recording medium storing a bitstream generated by an image encoding method or apparatus according to the present disclosure.

Another object of the present disclosure is to provide a recording medium storing a bitstream received, decoded and used to reconstruct an image by an image decoding apparatus according to the present disclosure.

The technical problems solved by the present disclosure are not limited to the above technical problems and other technical problems which are not described herein will become apparent to those skilled in the art from the following description.

Technical Solution

An image decoding method according to an aspect of the present disclosure is performed by an image decoding apparatus. The image decoding method comprises obtaining a reconstructed picture;

determining a target boundary of deblocking filtering in the reconstructed picture, determining a boundary strength for the target boundary, and applying deblocking filtering to the target boundary based on the boundary strength. Based on the target boundary being a transform block boundary and a color component of the reconstructed picture being a chroma component, the boundary strength may be determined based on whether joint CbCr residual coding is performed on at least one of two blocks adjacent to the target boundary, and the joint CbCr residual coding may correspond to encoding residual samples for a chroma Cb component and a chroma Cr component as a single transform block.

In the image decoding method according to the present disclosure, whether joint CbCr residual coding may be performed on a block adjacent to the target boundary is determined based on a first flag signaled for the adjacent block.

In the image decoding method according to the present disclosure, based on the target boundary being a transform block boundary and the color component of the reconstructed picture being a chroma component, the boundary strength may be determined further based on whether at least one of two blocks adjacent to the target boundary includes a non-zero transform coefficient level.

In the image decoding method according to the present disclosure, whether a block adjacent to the target boundary includes at least one non-zero transform coefficient level may be determined based on a second flag signaled for the adjacent block.

In the image decoding method according to the present disclosure, based on the target boundary being a transform block boundary and the color component of the reconstructed picture being a chroma component, the boundary strength may be determined based on a sum of two first flags and two second flags for two blocks adjacent to the target boundary.

In the image decoding method according to the present disclosure, the boundary strength may be determined to be 1, based on the sum being greater than 0.

In the image decoding method according to the present disclosure, based on the target boundary being a transform block boundary and the color component of the reconstructed picture being a luma component, the boundary strength may be determined based on whether at least one of two blocks adjacent to the target boundary includes a non-zero transform coefficient level.

An image decoding apparatus according to another embodiment of the present disclosure may comprise a memory and at least one processor. The at least one processor may include obtaining a reconstructed picture, determine a target boundary of deblocking filtering in the reconstructed picture, determining a boundary strength for the target boundary, and applying deblocking filtering to the target boundary based on the boundary strength. Based on the target boundary being a transform block boundary and a color component of the reconstructed picture being a chroma component, the boundary strength may be determined based on whether joint CbCr residual coding is performed on at least one of two blocks adjacent to the target boundary, and the joint CbCr residual coding may corresponds to encoding residual samples for a chroma Cb component and a chroma Cr component as a single transform block.

An image encoding method according to another aspect of the present disclosure may comprise generating a reconstructed picture, determining a target boundary of deblocking filtering in the reconstructed picture, determining a boundary strength for the target boundary, and applying deblocking filtering to the target boundary based on the boundary strength. Based on the target boundary being a transform block boundary and a color component of the reconstructed picture being a chroma component, the boundary strength may be determined based on whether joint CbCr residual coding is performed on at least one of two blocks adjacent to the target boundary, and the joint CbCr residual coding may correspond to encoding residual samples for a chroma Cb component and a chroma Cr component as a single transform block.

In the image encoding method according to the present disclosure, whether joint CbCr residual coding may be performed on a block adjacent to the target boundary is determined based on a first flag signaled for the adjacent block.

In the image encoding method according to the present disclosure, based on the target boundary being a transform block boundary and the color component of the reconstructed picture being a chroma component, the boundary strength may be determined further based on whether at least one of two blocks adjacent to the target boundary includes a non-zero transform coefficient level.

In the image encoding method according to the present disclosure, whether a block adjacent to the target boundary includes at least one non-zero transform coefficient level may be determined based on a second flag signaled for the adjacent block.

In the image encoding method according to the present disclosure, based on the target boundary being a transform block boundary and the color component of the reconstructed picture being a chroma component, the boundary strength may be determined based on a sum of two first flags and two second flags for two blocks adjacent to the target boundary.

In the image encoding method according to the present disclosure, the boundary strength may be determined to be 1, based on the sum being greater than 0.

A transmission method according to another aspect of the present disclosure may transmit a bitstream generated by the image encoding apparatus or the image encoding method of the present disclosure.

A computer-readable recording medium according to another aspect of the present disclosure may store a bitstream generated by the image encoding apparatus or the image encoding method of the present disclosure.

The features briefly summarized above with respect to the present disclosure are merely exemplary aspects of the detailed description below of the present disclosure, and do not limit the scope of the present disclosure.

4

Advantageous Effects

According to the present disclosure, it is possible to provide an image encoding/decoding method and apparatus with improved encoding/decoding efficiency.

According to the present disclosure, it is possible to provide an image encoding/decoding method and apparatus for performing deblocking filtering.

According to the present disclosure, it is possible to provide an image encoding/decoding method and apparatus for determining a boundary strength of deblocking filtering in order to perform deblocking filtering.

Also, according to the present disclosure, it is possible to provide a method of transmitting a bitstream generated by an image encoding method or apparatus according to the present disclosure.

Also, according to the present disclosure, it is possible to provide a recording medium storing a bitstream generated by an image encoding method or apparatus according to the present disclosure.

Also, according to the present disclosure, it is possible to provide a recording medium storing a bitstream received, decoded and used to reconstruct an image by an image decoding apparatus according to the present disclosure.

It will be appreciated by persons skilled in the art that the effects that can be achieved through the present disclosure are not limited to what has been particularly described hereinabove and other advantages of the present disclosure will be more clearly understood from the detailed description.

DESCRIPTION OF DRAWINGS

FIG. 8 is a view illustrating signaling of a syntax element in a transform block related to an embodiment of the present disclosure.

MODE FOR INVENTION

Figure 1:
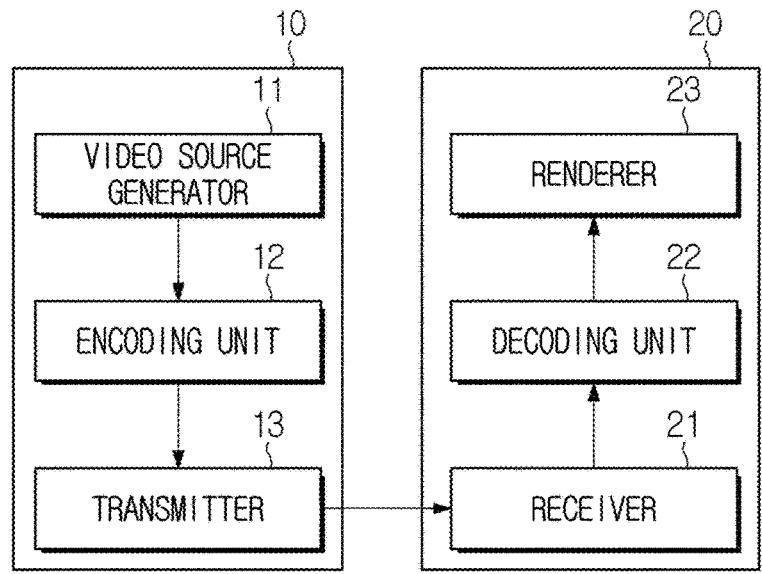
FIG. 1 is a view schematically showing a video coding system according to an embodiment of the present disclosure.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, in case it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

In the present disclosure, a "picture" generally refers to a unit representing one image in a specific time period, and a slice/tile/subpicture is a coding unit constituting a part of a picture, and one picture may be composed of one or more slices/tiles/subpictures. In addition, a slice/tile/subpicture may include one or more coding tree units (CTUs).

In the present disclosure, a "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In the present disclosure, a "unit" may represent a basic unit of image processing. The unit may include at least one of a specific region of the picture and information related to the region. The unit may be used interchangeably with terms such as "sample array", "block" or "area" in some cases. In a general case, an M×N block may include samples (or sample arrays) or a set (or array) of transform coefficients of M columns and N rows.

In the present disclosure, "current block" may mean one of "current coding block", "current coding unit", "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed, "current block" may mean "filtering target block".

In addition, in the present disclosure, a "current block" may mean "a luma block of a current block" unless explicitly stated as a chroma block. The "chroma block of the current block" may be expressed by including an explicit description of a chroma block, such as "chroma block" or "current chroma block".

In the present disclosure, the term "/" and "," should be interpreted to indicate "and/or." For instance, the expression "A/B" and "A, B" may mean "A and/or B." Further, "A/B/C" and "A/B/C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

Overview of Video Coding System

FIG. 1 is a view showing a video coding system according to the present disclosure.

The video coding system according to an embodiment may include a encoding apparatus 10 and a decoding apparatus 20. The encoding apparatus 10 may deliver encoded video and/or image information or data to the decoding apparatus 20 in the form of a file or streaming via a digital storage medium or network.

The encoding apparatus 10 according to an embodiment may include a video source generator 11, an encoding unit 12 and a transmitter 13. The decoding apparatus 20 according to an embodiment may include a receiver 21, a decoding unit 22 and a renderer 23. The encoding unit 12 may be called a video/image encoding unit, and the decoding unit 22 may be called a video/image decoding unit. The transmitter 13 may be included in the encoding unit 12. The receiver 21 may be included in the decoding unit 22. The renderer 23 may include a display and the display may be configured as a separate device or an external component.

The video source generator 11 may acquire a video/image through a process of capturing, synthesizing or generating the video/image. The video source generator 11 may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding unit 12 may encode an input video/image. The encoding unit 12 may perform a series of procedures such as prediction, transform, and quantization for compression and coding efficiency. The encoding unit 12 may output encoded data (encoded video/image information) in the form of a bitstream.

The transmitter 13 may transmit the encoded video/image information or data output in the form of a bitstream to the receiver 21 of the decoding apparatus 20 through a digital storage medium or a network in the form of a file or streaming. The digital storage medium may include various storage mediums such as USB, SD, CD, DVD, Blu-ray, HDD, SSD, and the like. The transmitter 13 may include an element for generating a media file through a predetermined file format and may include an element for transmission through a broadcast/communication network. The receiver 21 may extract/receive the bitstream from the storage medium or network and transmit the bitstream to the decoding unit 22.

The decoding unit 22 may decode the video/image by performing a series of procedures such as dequantization, inverse transform, and prediction corresponding to the operation of the encoding unit 12.

The renderer 23 may render the decoded video/image. The rendered video/image may be displayed through the display.

Overview of Image Encoding Apparatus

Figure 2:
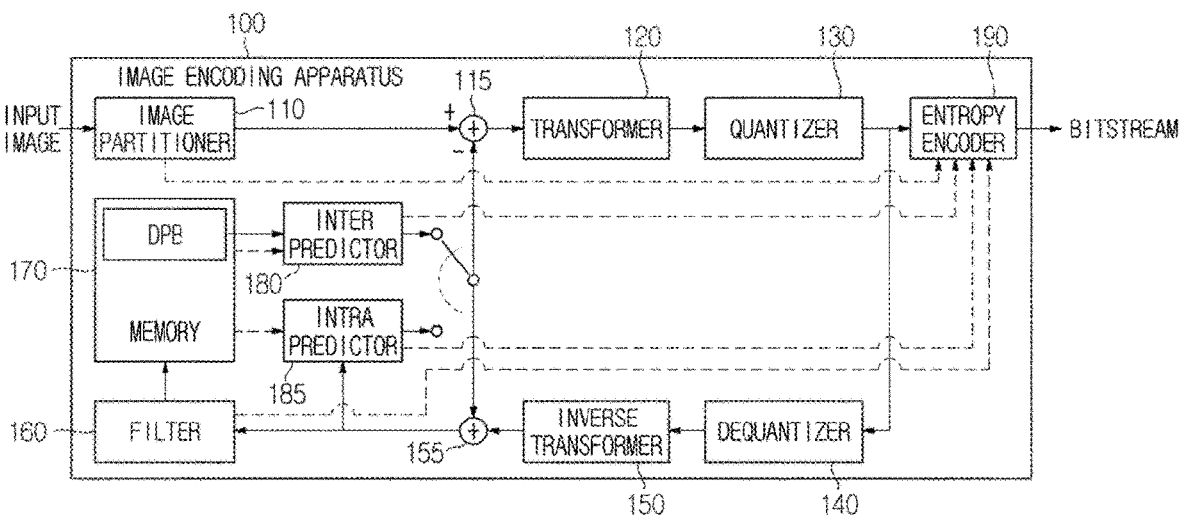
FIG. 2 is a view schematically showing an image encoding apparatus according to an embodiment of the present disclosure.

FIG. 2 is a view schematically showing an image encoding apparatus, to which an embodiment of the present disclosure is applicable.

As shown in FIG. 2, the image encoding apparatus 100 may include an image partitioner 110, a subtractor 115, a transformer 120, a quantizer 130, a dequantizer 140, an inverse transformer 150, an adder 155, a filter 160, a memory 170, an inter prediction unit 180, an intra prediction unit 185 and an entropy encoder 190. The inter prediction unit 180 and the intra prediction unit 185 may be collectively referred to as a "prediction unit". The transformer 120, the quantizer 130, the dequantizer 140 and the inverse transformer 150 may be included in a residual processor. The residual processor may further include the subtractor 115.

All or at least some of the plurality of components configuring the image encoding apparatus 100 may be configured by one hardware component (e.g., an encoder or a processor) in some embodiments. In addition, the memory 170 may include a decoded picture buffer (DPB) and may be configured by a digital storage medium.

The image partitioner 110 may partition an input image (or a picture or a frame) input to the image encoding apparatus 100 into one or more processing units. For example, the processing unit may be called a coding unit (CU). The coding unit may be acquired by recursively partitioning a coding tree unit (CTU) or a largest coding unit (LCU) according to a quad-tree binary-tree ternary-tree (QT/BT/TT) structure. For example, one coding unit may be partitioned into a plurality of coding units of a deeper depth based on a quad tree structure, a binary tree structure, and/or a ternary structure. For partitioning of the coding unit, a quad tree structure may be applied first and the binary tree structure and/or ternary structure may be applied later. The coding procedure according to the present disclosure may be performed based on the final coding unit that is no longer partitioned. The largest coding unit may be used as the final coding unit or the coding unit of deeper depth acquired by partitioning the largest coding unit may be used as the final coding unit. Here, the coding procedure may include a procedure of prediction, transform, and reconstruction, which will be described later. As another example, the processing unit of the coding procedure may be a prediction unit (PU) or a transform unit (TU). The prediction unit and the transform unit may be split or partitioned from the final coding unit. The prediction unit may be a unit of sample prediction, and the transform unit may be a unit for deriving a transform coefficient and/or a unit for deriving a residual signal from the transform coefficient.

The prediction unit (the inter prediction unit 180 or the intra prediction unit 185) may perform prediction on a block to be processed (current block) and generate a predicted block including prediction samples for the current block. The prediction unit may determine whether intra prediction or inter prediction is applied on a current block or CU basis. The prediction unit may generate various information related to prediction of the current block and transmit the generated information to the entropy encoder 190. The information on the prediction may be encoded in the entropy encoder 190 and output in the form of a bitstream.

The intra prediction unit 185 may predict the current block by referring to the samples in the current picture. The referred samples may be located in the neighborhood of the current block or may be located apart according to the intra prediction mode and/or the intra prediction technique. The intra prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra prediction unit 185 may determine the prediction mode applied to the current block by using a prediction mode applied to a neighboring block.

The inter prediction unit 180 may derive a predicted block for the current block based on a reference block (reference sample array) specified by a motion vector on a reference picture. In this case, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like. The reference picture including the temporal neighboring block may be called a collocated picture (colPic). For example, the inter prediction unit 180 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter prediction unit 180 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and the motion vector of the current block may be signaled by encoding a motion vector difference and an indicator for a motion vector predictor. The motion vector difference may mean a difference between the motion vector of the current block and the motion vector predictor.

The prediction unit may generate a prediction signal based on various prediction methods and prediction techniques described below. For example, the prediction unit may not only apply intra prediction or inter prediction but also simultaneously apply both intra prediction and inter prediction, in order to predict the current block. A prediction method of simultaneously applying both intra prediction and inter prediction for prediction of the current block may be called combined inter and intra prediction (CIIP). In addition, the prediction unit may perform intra block copy (IBC) for prediction of the current block. Intra block copy may be used for content image/video coding of a game or the like, for example, screen content coding (SCC). IBC is a method of predicting a current picture using a previously reconstructed reference block in the current picture at a location apart from the current block by a predetermined distance. When IBC is applied, the location of the reference block in the current picture may be encoded as a vector (block vector) corresponding to the predetermined distance. In IBC, prediction is basically performed in the current picture, but may be performed similarly to inter prediction in that a reference block is derived within the current picture. That is, IBC may use at least one of the inter prediction techniques described in the present disclosure.

The prediction signal generated by the prediction unit may be used to generate a reconstructed signal or to generate a residual signal. The subtractor 115 may generate a residual signal (residual block or residual sample array) by subtracting the prediction signal (predicted block or prediction sample array) output from the prediction unit from the input image signal (original block or original sample array). The generated residual signal may be transmitted to the transformer 120.

The transformer 120 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform acquired based on a prediction signal generated using all previously reconstructed pixels. In addition, the transform process may be applied to square pixel blocks having the same size or may be applied to blocks having a variable size rather than square.

The quantizer 130 may quantize the transform coefficients and transmit them to the entropy encoder 190. The entropy encoder 190 may encode the quantized signal (information on the quantized transform coefficients) and output a bitstream. The information on the quantized transform coefficients may be referred to as residual information. The quantizer 130 may rearrange quantized transform coefficients in a block form into a one-dimensional vector form based on a coefficient scanning order and generate information on the quantized transform coefficients based on the quantized transform coefficients in the one-dimensional vector form.

The entropy encoder 190 may perform various encoding methods such as, for example, exponential Golomb, context-adaptive variable length coding (CAVLC), context-adaptive binary arithmetic coding (CABAC), and the like. The entropy encoder 190 may encode information necessary for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. The signaled information, transmitted information and/or syntax elements described in the present disclosure may be encoded through the above-described encoding procedure and included in the bitstream.

The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 190 and/or a storage unit (not shown) storing the signal may be included as internal/external element of the image encoding apparatus 100. Alternatively, the transmitter may be provided as the component of the entropy encoder 190.

The quantized transform coefficients output from the quantizer 130 may be used to generate a residual signal. For example, the residual signal (residual block or residual samples) may be reconstructed by applying dequantization and inverse transform to the quantized transform coefficients through the dequantizer 140 and the inverse transformer 150.

The adder 155 adds the reconstructed residual signal to the prediction signal output from the inter prediction unit 180 or the intra prediction unit 185 to generate a reconstructed signal (reconstructed picture, reconstructed block, reconstructed sample array). In case there is no residual for the block to be processed, such as a case where the skip mode is applied, the predicted block may be used as the reconstructed block. The adder 155 may be called a reconstructor or a reconstructed block generator. The generated reconstructed signal may be used for intra prediction of a next block to be processed in the current picture and may be used for inter prediction of a next picture through filtering as described below.

The filter 160 may improve subjective/objective image quality by applying filtering to the reconstructed signal. For example, the filter 160 may generate a modified reconstructed picture by applying various filtering methods to the reconstructed picture and store the modified reconstructed picture in the memory 170, specifically, a DPB of the memory 170. The various filtering methods may include, for example, deblocking filtering, a sample adaptive offset, an adaptive loop filter, a bilateral filter, and the like. The filter 160 may generate various information related to filtering and transmit the generated information to the entropy encoder 190 as described later in the description of each filtering method. The information related to filtering may be encoded by the entropy encoder 190 and output in the form of a bitstream.

The modified reconstructed picture transmitted to the memory 170 may be used as the reference picture in the inter prediction unit 180. When inter prediction is applied through the image encoding apparatus 100, prediction mismatch between the image encoding apparatus 100 and the image decoding apparatus may be avoided and encoding efficiency may be improved.

The DPB of the memory 170 may store the modified reconstructed picture for use as a reference picture in the inter prediction unit 180. The memory 170 may store the motion information of the block from which the motion information in the current picture is derived (or encoded) and/or the motion information of the blocks in the picture that have already been reconstructed. The stored motion information may be transmitted to the inter prediction unit 180 and used as the motion information of the spatial neighboring block or the motion information of the temporal neighboring block. The memory 170 may store reconstructed samples of reconstructed blocks in the current picture and may transfer the reconstructed samples to the intra prediction unit 185.

Overview of Image Decoding Apparatus

Figure 3:
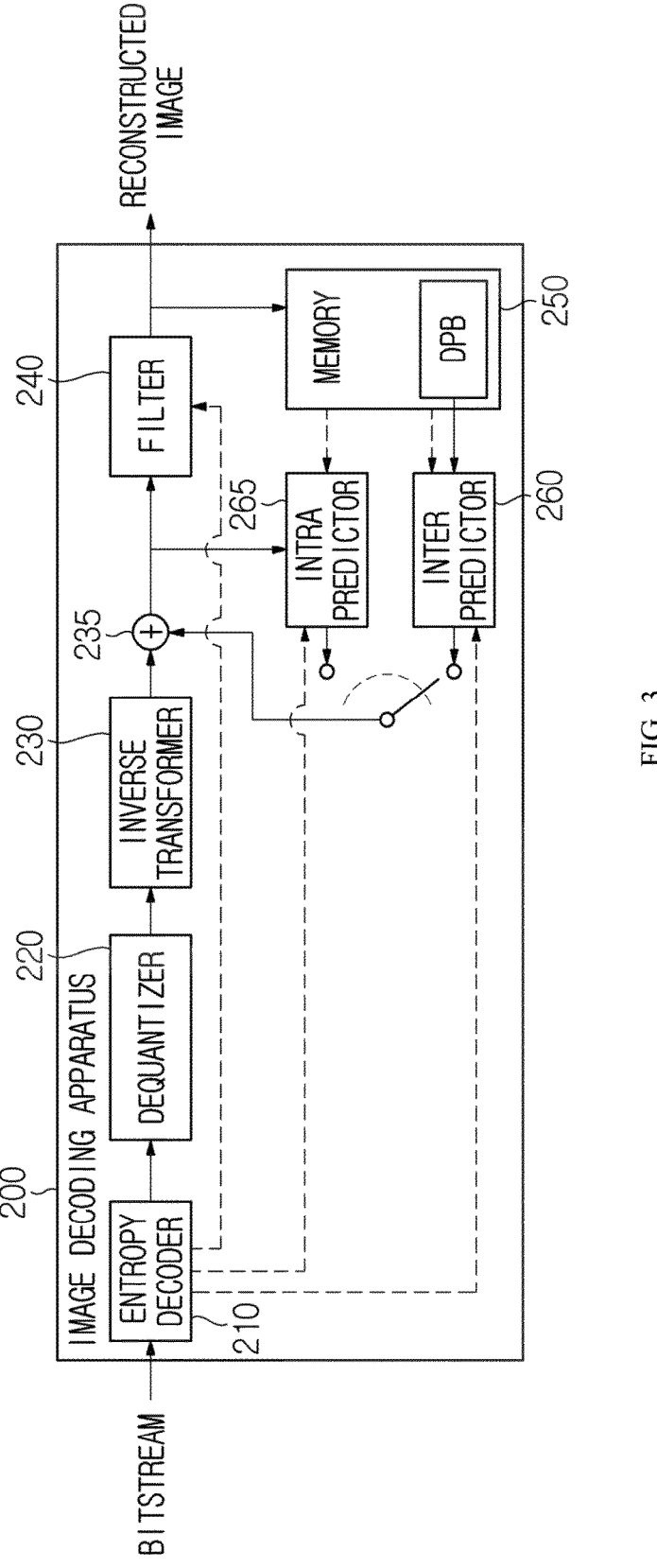
FIG. 3 is a view schematically showing an image decoding apparatus according to an embodiment of the present disclosure.

FIG. 3 is a view schematically showing an image decoding apparatus, to which an embodiment of the present disclosure is applicable.

As shown in FIG. 3, the image decoding apparatus 200 may include an entropy decoder 210, a dequantizer 220, an inverse transformer 230, an adder 235, a filter 240, a memory 250, an inter prediction unit 260 and an intra prediction unit 265. The inter prediction unit 260 and the intra prediction unit 265 may be collectively referred to as a "prediction unit". The dequantizer 220 and the inverse transformer 230 may be included in a residual processor.

All or at least some of a plurality of components configuring the image decoding apparatus 200 may be configured by a hardware component (e.g., a decoder or a processor) according to an embodiment. In addition, the memory 250 may include a decoded picture buffer (DPB) or may be configured by a digital storage medium.

The image decoding apparatus 200, which has received a bitstream including video/image information, may reconstruct an image by performing a process corresponding to a process performed by the image encoding apparatus 100 of FIG. 2. For example, the image decoding apparatus 200 may perform decoding using a processing unit applied in the image encoding apparatus. Thus, the processing unit of decoding may be a coding unit, for example. The coding unit may be acquired by partitioning a coding tree unit or a largest coding unit. The reconstructed image signal decoded and output through the image decoding apparatus 200 may be reproduced through a reproducing apparatus (not shown).

The image decoding apparatus 200 may receive a signal output from the image encoding apparatus of FIG. 2 in the form of a bitstream. The received signal may be decoded through the entropy decoder 210. For example, the entropy decoder 210 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The image decoding apparatus may further decode picture based on the information on the parameter set and/or the general constraint information. Signaled/received information and/or syntax elements described in the present disclosure may be decoded through the decoding procedure and obtained from the bitstream. For example, the entropy decoder 210 decodes the information in the bitstream based on a coding method such as exponential Golomb coding, CAVLC, or CABAC, and output values of syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a neighboring block and a decoding target block or information of a symbol/bin decoded in a previous stage, and perform arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 210 may be provided to the prediction unit (the inter prediction unit 260 and the intra prediction unit 265), and the residual value on which the entropy decoding was performed in the entropy decoder 210, that is, the quantized transform coefficients and related parameter information, may be input to the dequantizer 220. In addition, information on filtering among information decoded by the entropy decoder 210 may be provided to the filter 240. Meanwhile, a receiver (not shown) for receiving a signal output from the image encoding apparatus may be further configured as an internal/external element of the image decoding apparatus 200, or the receiver may be a component of the entropy decoder 210.

Meanwhile, the image decoding apparatus according to the present disclosure may be referred to as a video/image/picture decoding apparatus. The image decoding apparatus may be classified into an information decoder (video/image/picture information decoder) and a sample decoder (video/image/picture sample decoder). The information decoder may include the entropy decoder 210. The sample decoder may include at least one of the dequantizer 220, the inverse transformer 230, the adder 235, the filter 240, the memory 250, the inter prediction unit 260 or the intra prediction unit 265.

The dequantizer 220 may dequantize the quantized transform coefficients and output the transform coefficients. The dequantizer 220 may rearrange the quantized transform coefficients in the form of a two-dimensional block. In this case, the rearrangement may be performed based on the coefficient scanning order performed in the image encoding apparatus. The dequantizer 220 may perform dequantization on the quantized transform coefficients by using a quantization parameter (e.g., quantization step size information) and obtain transform coefficients.

The inverse transformer 230 may inversely transform the transform coefficients to obtain a residual signal (residual block, residual sample array).

The prediction unit may perform prediction on the current block and generate a predicted block including prediction samples for the current block. The prediction unit may determine whether intra prediction or inter prediction is applied to the current block based on the information on the prediction output from the entropy decoder 210 and may determine a specific intra/inter prediction mode (prediction technique).

It is the same as described in the prediction unit of the image encoding apparatus 100 that the prediction unit may generate the prediction signal based on various prediction methods (techniques) which will be described later.

The intra prediction unit 265 may predict the current block by referring to the samples in the current picture. The description of the intra prediction unit 185 is equally applied to the intra prediction unit 265.

The inter prediction unit 260 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter prediction unit 260 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 235 may generate a reconstructed signal (reconstructed picture, reconstructed block, reconstructed sample array) by adding the obtained residual signal to the prediction signal (predicted block, predicted sample array) output from the prediction unit (including the inter prediction unit 260 and/or the intra prediction unit 265). The description of the adder 155 is equally applicable to the adder 235. In case there is no residual for the block to be processed, such as when the skip mode is applied, the predicted block may be used as the reconstructed block. The description of the adder 155 is equally applicable to the adder 235. The adder 235 may be called a reconstructor or a reconstructed block generator. The generated reconstructed signal may be used for intra prediction of a next block to be processed in the current picture and may be used for inter prediction of a next picture through filtering as described below.

The filter 240 may improve subjective/objective image quality by applying filtering to the reconstructed signal. For example, the filter 240 may generate a modified reconstructed picture by applying various filtering methods to the reconstructed picture and store the modified reconstructed picture in the memory 250, specifically, a DPB of the memory 250. The various filtering methods may include, for example, deblocking filtering, a sample adaptive offset, an adaptive loop filter, a bilateral filter, and the like.

The (modified) reconstructed picture stored in the DPB of the memory 250 may be used as a reference picture in the inter prediction unit 260. The memory 250 may store the motion information of the block from which the motion information in the current picture is derived (or decoded) and/or the motion information of the blocks in the picture that have already been reconstructed. The stored motion information may be transmitted to the inter prediction unit 260 so as to be utilized as the motion information of the spatial neighboring block or the motion information of the temporal neighboring block. The memory 250 may store reconstructed samples of reconstructed blocks in the current picture and transfer the reconstructed samples to the intra prediction unit 265.

In the present disclosure, the embodiments described in the filter 160, the inter prediction unit 180, and the intra prediction unit 185 of the image encoding apparatus 100 may be equally or correspondingly applied to the filter 240, the inter prediction unit 260, and the intra prediction unit 265 of the image decoding apparatus 200.

Overview of Image Decoding/Encoding Procedure

In image/video coding, a picture configuring an image/video may be encoded/decoded according to a series of decoding order. A picture order corresponding to an output order of the decoded picture may be set differently from the above decoding order, and, based on this, not only forward prediction but also backward prediction may be performed during inter prediction.

Figure 4:
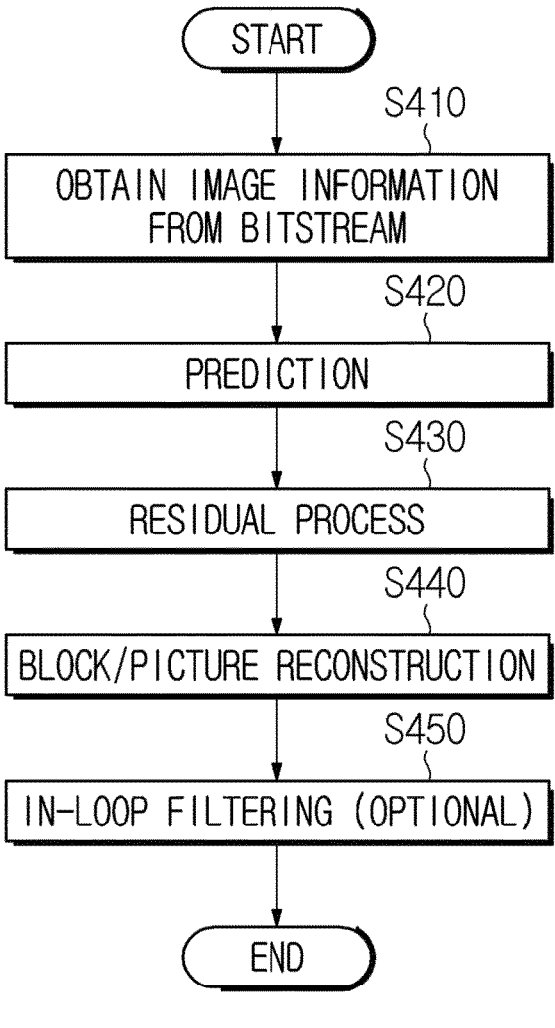
FIG. 4 is a schematic flowchart of an image decoding procedure, to which an embodiment of the present disclosure is applicable.

FIG. 4 is a schematic flowchart of an image decoding procedure, to which an embodiment of the present disclosure is applicable.

Each procedure shown in FIG. 4 may be performed by the image decoding apparatus of FIG. 3. For example, step S410 may be performed by the entropy decoder 210 of the image decoding apparatus, step S420 may be performed by the prediction units 260 and 265, step S430 may be performed by the residual processors 220 and 230, step S440 may be performed by the adder 235, and step S450 may be performed by the filter 240. Step S410 may include the information decoding (parsing) procedure described in the present disclosure, step S420 may include the inter/intra prediction procedure described in the present disclosure, step S430 may include a residual processing procedure described in the present disclosure, step S440 may include the block/picture reconstruction procedure described in the present disclosure, and step S450 may include the in-loop filtering procedure described in the present disclosure. Referring to FIG. 4, the picture decoding procedure may schematically include a procedure (S410) for obtaining video/image information (through decoding) from a bitstream, an image (picture) reconstruction procedure (S420 to S440) and an in-loop filtering procedure (S450) for a reconstructed image (picture). The image reconstruction procedure may be performed based on prediction samples obtained through inter/intra prediction (S420) and residual samples obtained residual processing (S430) (dequantization and inverse transform for the quantized transform coefficient). A modified reconstructed picture may be generated through the in-loop filtering procedure (S450) for the reconstructed picture generated through the image reconstruction procedure, the modified reconstructed picture may be output as a decoded picture, stored in a decoded picture buffer (DPB) 250 or memory of the image decoding apparatus and used as a reference picture in the inter prediction procedure when decoding later picture. In some cases, the in-loop filtering procedure may be omitted. In this case, the reconstructed picture may be output as a decoded picture, stored in a DPB 250 or memory of the image decoding apparatus, and used as a reference picture in the inter prediction procedure when decoding later picture. The in-loop filtering procedure (S450) may include a deblocking filtering procedure, a sample adaptive offset (SAO) procedure, an adaptive loop filter (ALF) procedure and/or a bi-lateral filter procedure, as described above, some or all of which may be omitted. In addition, one or some of the deblocking filtering procedure, the sample adaptive offset (SAO) procedure, the adaptive loop filter (ALF) procedure and/or the bi-lateral filter procedure may be sequentially applied or all of them may be sequentially applied. For example, after the deblocking filtering procedure applies to the reconstructed picture, the SAO procedure may be performed. Alternatively, after the deblocking filtering procedure applies to the reconstructed picture, the ALF procedure may be performed. This may be similarly performed even in the image encoding apparatus.

Figures 5, 6:
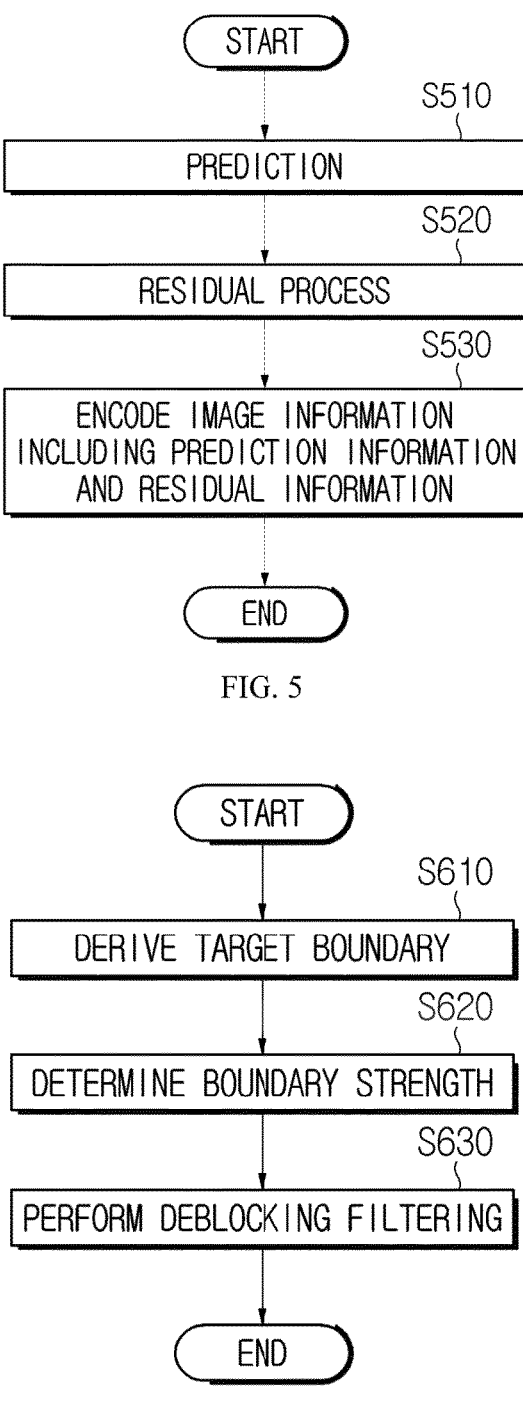
FIG. 5 is a schematic flowchart of an image encoding procedure, to which an embodiment of the present disclosure is applicable.
FIG. 6 is a flowchart illustrating deblocking filtering according to the present disclosure.

FIG. 5 is a schematic flowchart of an image encoding procedure, to which an embodiment of the present disclosure is applicable.

Each procedure shown in FIG. 5 may be performed by the image encoding apparatus of FIG. 2. For example, step S510 may be performed by the prediction units 180 and 185 of the image encoding apparatus, step S520 may be performed by the residual processors 115, 120 and 130, and step S530 may be performed in the entropy encoder 190. Step S510 may include the inter/intra prediction procedure described in the present disclosure, step S520 may include the residual processing procedure described in the present disclosure, and step S530 may include the information encoding procedure described in the present disclosure.

Referring to FIG. 5, the image encoding procedure may schematically include not only a procedure for encoding and outputting information for picture reconstruction (e.g., prediction information, residual information, partitioning information, etc.) in the form of a bitstream but also a procedure for generating a reconstructed picture for a current picture and a procedure (optional) for applying in-loop filtering to a reconstructed picture. The image encoding apparatus may derive (modified) residual samples from a quantized transform coefficient through the dequantizer 140 and the inverse transformer 150, and generate the reconstructed picture based on the prediction samples which are output of step S510 and the (modified) residual samples. The reconstructed picture generated in this way may be equal to the reconstructed picture generated in the image decoding apparatus. The modified reconstructed picture may be generated through the in-loop filtering procedure for the reconstructed picture and may be stored in the decoded picture buffer (DPB) 170 or memory, and may be used as a reference picture in the inter prediction procedure when encoding later picture, similarly to the image decoding apparatus. As described above, in some cases, some or all of the in-loop filtering procedure may be omitted. When the in-loop filtering procedure is performed, (in-loop) filtering related information (parameter) may be encoded in the entropy encoder 190 and output in the form of a bitstream, and the image decoding apparatus may perform the in-loop filtering procedure using the same method as the image encoding apparatus based on the filtering related information.

Through such an in-loop filtering procedure, noise occurring during video/image coding, such as blocking artifact and ringing artifact, may be reduced and subjective/objective visual quality may be improved. In addition, by performing the in-loop filtering procedure in both the image encoding apparatus and the image decoding apparatus, the image encoding apparatus and the image decoding apparatus may derive the same prediction result, picture coding reliability may be increased and the amount of data to be transmitted for picture coding may be reduced.

As described above, the image (picture) reconstruction procedure may be performed not only in the image decoding apparatus but also in the image encoding apparatus. A reconstructed block may be generated based on intra prediction/inter prediction in units of blocks, and a reconstructed picture including reconstructed blocks may be generated. When a current picture/slice/tile group is an I picture/slice/tile group, blocks included in the current picture/slice/tile group may be reconstructed based on only intra prediction. On the other hand, when the current picture/slice/tile group is a P or B picture/slice/tile group, blocks included in the current picture/slice/tile group may be reconstructed based on intra prediction or inter prediction. In this case, inter prediction may be applied for some blocks in the current picture/slice/tile group and intra prediction may be applied for the remaining blocks. The color component of the picture may include a luma component and a chroma component and the methods and embodiments of the present disclosure are applicable to both the luma component and the chroma component unless explicitly limited in the present disclosure.

FIG. 6 is a flowchart illustrating deblocking filtering according to the present disclosure. Deblocking filtering shown in FIG. 6 may correspond to deblocking filtering of in-loop filtering described above. Deblocking filtering shown in FIG. 6 may be performed, for example, by the filter 160 of FIG. 2 or the filter 240 of FIG. 3.

Deblocking filtering may correspond to filtering technique for removing distortion occurring at a boundary between blocks in a reconstructed picture. A target boundary may be derived from a reconstructed picture through a deblocking filtering procedure (S610). In addition, a boundary strength (BS) for the derived target boundary may be determined. Deblocking filtering for the target boundary may be performed based on the determined boundary strength (S630). The boundary strength may be determined based on a prediction mode of two blocks adjacent to the target boundary, a motion vector difference, whether reference pictures are the same and/or presence/absence of a non-zero valid coefficient.

Deblocking filtering may be applied to the reconstructed picture. Deblocking filtering may be performed in the same order as a decoding process for each CU of the reconstructed picture. First, a vertical edge may be filtered (horizontal filtering). Thereafter, a horizontal edge may be filtered (vertical filtering). Deblocking filtering may be applied to all coding block (or subblock) edges and transform block edges.

As described above, in-loop filtering may include SAO. SAO may correspond to a method of compensating for an offset difference between a reconstructed picture and an original picture in units of samples. For example, SAO may be applied based on a type such as a band offset or an edge offset. According to SAO, samples may be classified into different categories according to each SAO type. An offset value may be added to each sample based on the classified categories. Filtering information for SAO may include information on whether SAO is applied, SAO type information and/or SAO offset value information. SAO may be applied for a reconstructed picture after applying deblocking filtering.

In addition, in-loop filtering may include ALF. ALF may correspond to a technique for performing filtering on a reconstructed picture in units of samples based on filter coefficients according to a filter shape. An encoding apparatus may determine whether to apply ALF, an ALF shape and/or an ALF filtering coefficient, through comparison between the reconstructed picture and the original picture. In addition, this may be signaled to a decoding apparatus. Filtering information for ALF may include information whether to apply ALF, ALF filter shape information and/or ALF filtering coefficient information. ALF may be applied for a reconstructed picture after applying deblocking filtering.

According to some embodiments of the present disclosure, a boundary strength may be determined according to a condition for two blocks adjacent to a target boundary. In the present disclosure, a boundary strength and a boundary filtering strength may be used interchangeably.

Figure 14:
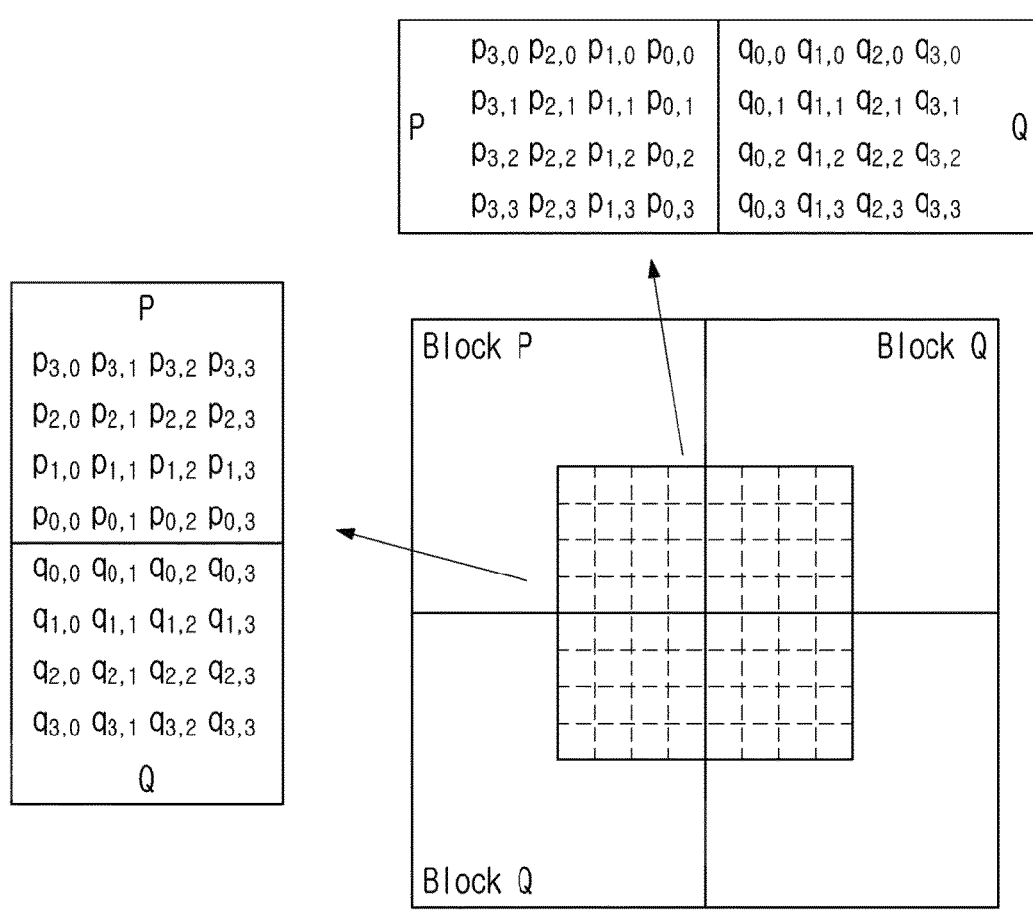
FIG. 14 is a view illustrating two blocks and samples adjacent to a target boundary of deblocking filtering according to an embodiment of the present disclosure.

FIG. 14 is a view illustrating two blocks and samples adjacent to a target boundary of deblocking filtering according to an embodiment of the present disclosure.

In FIG. 14, a boundary denoted by a thick solid line may be a target boundary of deblocking filtering.

As shown in FIG. 14, when a target boundary is a vertical boundary, a left block may be defined as a P block and a right block may be defined as a Q block based on the target boundary. In addition, when the target boundary is a horizontal boundary, an upper block may be defined as a P block and a lower block may be defined as a Q block based on the target boundary.

In the present disclosure, a sample in a P block may be denoted by $p_n$, and a sample in a Q block may be denoted by $q_n$. That is, $p_n$ and $q_n$ may be samples facing a boundary (target boundary) between the P block and the Q block. In this case, n may be an integer greater than or equal to 0, and may mean a distance from the target boundary. $p_0$ may be a sample in a P block immediately adjacent to the target boundary, and $q_0$ may mean a sample in a Q block immediately adjacent to the target boundary. For example, $p_0$ may be a sample of a left or upper block adjoining the target boundary, and $q_0$ may be a sample of a right or lower block adjoining the target boundary. Alternatively, as shown in FIG. 14, a sample in the P block may be denoted by $p_{n,m}$, and a sample in the Q block may be denoted by $q_{n,m}$. In this case, n is an integer greater than or equal to 0 as described above and may mean a distance from the target boundary. In addition, m may be an index for distinguishing samples located at the same distance from the target boundary in one block (P block or Q block).

In addition, in the following description, first, second and third values of the boundary strength may respectively mean 0, 1 and 2, but the scope of the present disclosure is not limited by such a definition.

An image encoding apparatus and an image decoding apparatus may perform deblocking filtering based on the boundary strength. For example, when the boundary strength is a first value (e.g., 0), filtering may not be applied for the corresponding target boundary. Deblocking filtering may be applied based on a filter strength (strong filter/weak filter) and/or a filter length.

In the present disclosure, deblocking filtering may be performed by obtaining information related to deblocking filtering from a bitstream. For example, the information related to the deblocking filtering may include a flag specifying whether deblocking filtering is available. In addition, the information related to deblocking filtering may include information used to derive the boundary strength.

The deblocking filtering procedure may be individually performed according to the color components (luma component (Y) and chroma components (cb, cr)) of the reconstructed picture. For example, the boundary strength bS may be differently derived according to the color components (luma component (Y) and chroma components (cb, cr)). In addition, for example, the target boundary may be individually derived according to the color components (luma component (Y) and chroma components (cb, cr)). In the present disclosure, the color component may be specified by a component index cIdx. For example, when cIdx is 0, it may specify a luma component. In addition, when cIdx is 1, it may specify a chroma component cb and, when cIdx is 2, it may specify a chroma component cr.

Figure 7:
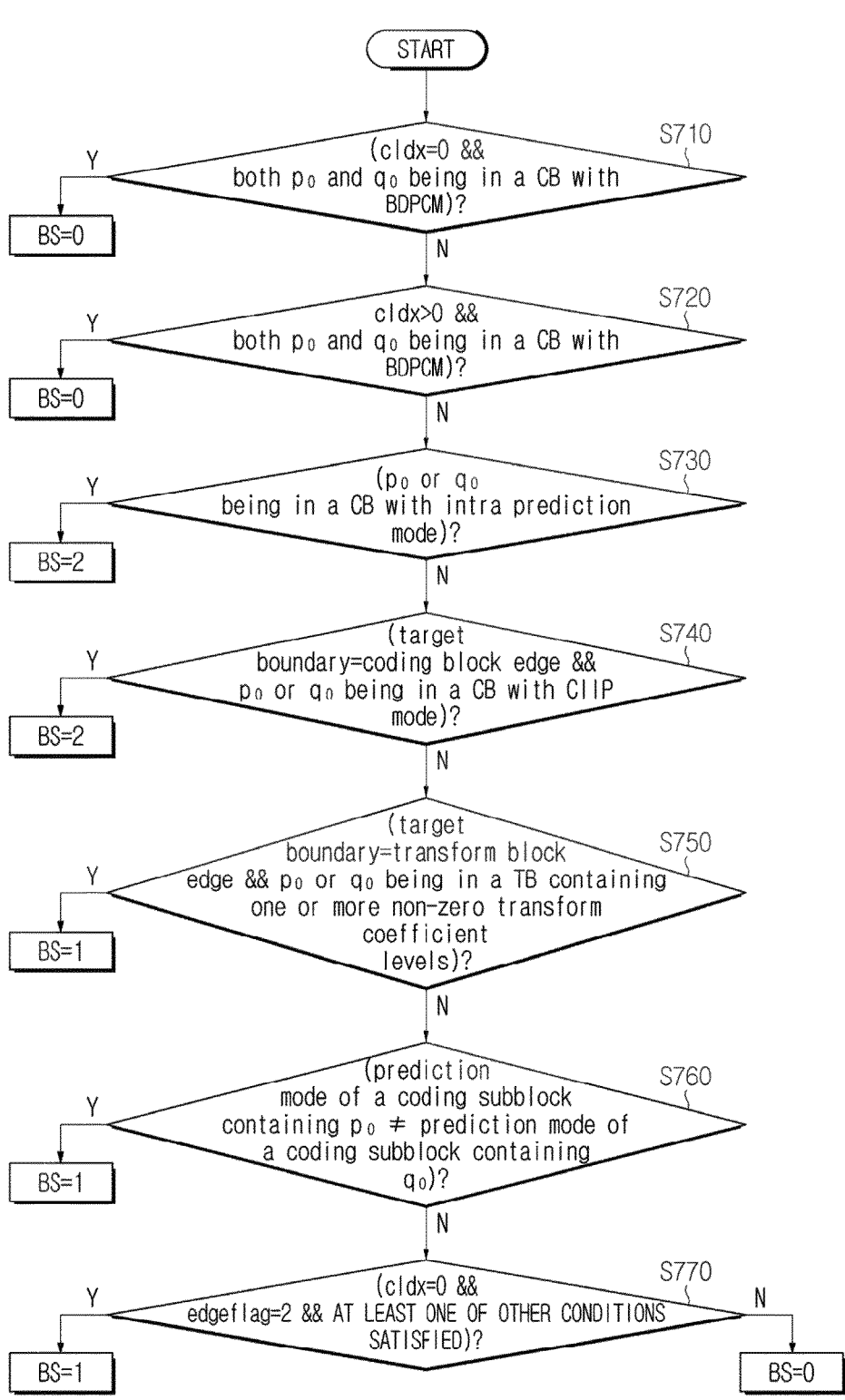
FIG. 7 is a flowchart illustrating a method of determining a boundary strength for a target boundary according to an embodiment of the present disclosure.

FIG. 7 is a flowchart illustrating a method of determining a boundary strength for a target boundary according to an embodiment of the present disclosure.

Referring to FIG. 7, whether a current block is a luma component block (e.g., cIdx=0) and both samples $p_0$ and $q_0$ are included in a coding block (e.g., intra_bdpcm_luma_flag=1) to which block based quantized residual domain differential pulse-code modulation (BDPCM) is applied may be determined (S710). When the above conditions are satisfied (S710-YES), a boundary strength for the corresponding target boundary may be determined to be a first value (e.g., 0).

When the conditions of step S710 are not satisfied (S710-No), step S720 may be determined. Specifically, whether a current block is a chroma component block (e.g., cIdx>0) and both samples $p_0$ and $q_0$ are included in a coding block (e.g., intra_bdpcm_chroma_flag=1) to which BDPCM is applied may be determined (S720). When the above conditions are satisfied (S720-YES), a target strength for the corresponding target boundary may be determined to be a first value (e.g., 0).

When the conditions of step S720 are not satisfied (S720-No), step S730 may be determined. Specifically, whether a sample $p_0$ or a sample $q_0$ is included in a coding block coded in an intra prediction mode may be determined (S730). When the above condition is satisfied (S730-YES), the boundary strength for the corresponding target boundary may be determined to be a third value (e.g., 2).

When the condition of S730 is not satisfied (S730-No), step S740 may be determined. Specifically, whether the target boundary is a boundary of a coding block and the sample $p_0$ or the sample $q_0$ is included in a coding block (e.g., ciip_flag=1) to which a combined inter and intra prediction (CIIP) is applied may be determined (S740). When the above condition is satisfied (S740-YES), the boundary strength for the corresponding target boundary may be determined to be a third value (e.g., 2).

When the condition of step S740 is not satisfied (S740-No), step S750 may be determined. Specifically, whether a target boundary is a boundary of a transform block and the sample $p_0$ or the sample $q_0$ is included in a transform block having one or more non-zero transform coefficient levels may be determined (S750). When the above condition is satisfied (S750-YES), the boundary strength for the corresponding target boundary may be determined to be a second value (e.g., 1).

When the condition of step S750 is not satisfied (S750-No), step S760 may be determined. Specifically, whether a prediction mode of a coding subblock containing the sample $p_0$ and a prediction mode of a coding subblock containing the sample $q_0$ are different may be determined (S760). When the above condition is satisfied (S760-YES), the boundary strength for the corresponding target boundary may be determined to be a second value (e.g., 1). For example, when one of two coding subblock located at both sides of the target boundary is coded in an IBC prediction mode and the other is coded in an inter prediction mode, the boundary strength for the corresponding target boundary may be determined to be a second value (e.g., 1).

When the condition of step S760 is not satisfied (S760-No), step S770 may be determined. Specifically, in step S770, whether the color component is a luma component (e.g., cIdx=0), the target boundary is a boundary of a subblock (e.g., edgeFlags=2) and at least one of various other conditions described below is satisfied may be determined (S770). In step S770, when the color component is a luma component, the target boundary is a boundary of a subblock and at least one of the other conditions (Condition 1 to Condition 5) described below is satisfied (S770-Yes), the boundary strength for the corresponding target boundary may be determined to be a second value (e.g., 1).

Condition 1: Both a coding subblock containing the sample $p_0$ and a coding subblock containing the sample $q_0$ are coded in an IBC prediction mode and a difference between horizontal components or vertical components of a block vector of each subblock is greater than or equal to an 8-unit value in a $\frac{1}{16}$ luma sample unit.

Condition 2: A coding subblock containing the sample $p_0$ and a coding subblock containing the sample $q_0$ reference different reference pictures or have different numbers of motion vectors. In Condition 2, whether the reference pictures are the same is determined by considering only whether pictures referenced for inter prediction are the same, and whether the corresponding reference picture belongs to reference picture list 0 or reference picture list 1 is not considered. In addition, whether index values specifying the corresponding reference picture are the same is not considered. In addition, the number of motion vectors may be determined using prediction direction flag (PredFlagL0, PredFlagL1) values. For example, the number of motion vectors may be derived as PredFlagL0+PredFlagL1.

Condition 3: One motion vector is used to predict the coding subblock containing the sample $p_0$ and the coding subblock containing the sample $q_0$, and a difference between horizontal components or vertical components of a motion vector of each subblock may be greater than or equal to an 8-unit value in a $\frac{1}{16}$ luma sample unit.

Condition 4: Two motion vectors and two different reference pictures are used to predict the coding subblock including the same $p_0$, and two motion vectors and two same reference pictures are used to predict the coding subblock containing the sample $q_0$, and the difference between the horizontal components or the vertical components of the motion vectors for the same reference picture may be greater than or equal to an 8-unit value in a $\frac{1}{16}$ luma sample unit.

Condition 5: Two motion vectors for the same reference pictures are used to predict the coding subblock containing the sample $p_0$, two motion vectors for the same reference picture are used to predict the coding subblock containing the sample $q_0$, and both the following two conditions (Condition 5-1 and Condition 5-2) are satisfied.

Condition 5-1: The difference between the horizontal components or the vertical components of the list 0 motion vectors used to predict each coding subblock may be greater than or equal to an 8-unit value in a $\frac{1}{16}$ luma sample unit and the difference between the horizontal components or the vertical components of the list 1 motion vectors used to predict each coding subblock may be greater than or equal to an 8-unit value in a $\frac{1}{16}$ luma sample unit.

Condition 5-2: The difference between the horizontal components or the vertical components between a list 0 motion vector used to predict a coding subblock including the subblock $p_0$ and a list 1 motion vector used to predict the coding subblock containing the sample $q_0$ may be greater than or equal to an 8-unit value in a $\frac{1}{16}$ luma sample unit or the difference between the horizontal components or the vertical components between the list 1 motion vector used to predict a coding subblock including the subblock $p_0$ and the list 0 motion vector used to predict the coding subblock containing the sample $q_0$ may be greater than or equal to an 8-unit value in a $\frac{1}{16}$ luma sample unit.

In Condition 1 to 5 above, the difference between the vertical (or horizontal) components of the motion vectors may mean an absolute value of a difference between the vertical (or horizontal) components of the motion vectors.

When the condition of step S770 is not satisfied (S770-No), the boundary strength for the corresponding target boundary may be determined to be a first value (e.g., 0).

A method of determining a boundary strength bS described with reference to FIG. 7 is exemplary and the boundary strength determination method according to the present disclosure is not limited to the example shown in FIG. 7. For example, some of the steps shown in FIG. 7 may be omitted and steps other than the steps shown in FIG. 7 may be added to any positions of the flowchart of FIG. 7. In addition, some of the steps shown in FIG. 7 may be performed simultaneously with the other steps or the order of steps may be changed.

In the example shown in FIG. 7, step S750 determines whether two transform blocks adjacent to the target boundary include a non-zero transform coefficient level. In addition, when the condition of step S750 is satisfied, the boundary strength for the corresponding target boundary may be determined to be a second value (e.g., 1)

However, when residual samples for two chroma components (e.g., Cb component and Cr component) are encoded as a single transform block, a problem that determination of the boundary strength of the block boundary is inaccurate may occur in relation to determination of step S750. For example, in the present disclosure, "joint CbCr residual coding" may mean technology in which residual samples for two chroma components (e.g., Cb component and Cr component) are encoded as a single transform block. Whether joint CbCr residual coding is applied for the current block may be determined based on information (e.g., flag) signaled through a bitstream. That is, the image encoding apparatus may determine whether joint CbCr residual coding is performed on the current block and encode the flag information into a bitstream based on this. In addition, the image decoding apparatus may determine whether joint CbCr residual coding is performed (has been performed) on the current block by parsing the flag information from the bitstream, and reconstruct the current block based on this. For example, the flag information may be tu_joint_cber_residual_flag in the present disclosure.

FIG. 8 is a view illustrating signaling of a syntax element in a transform block related to an embodiment of the present disclosure.

In the example shown in FIG. 8, tu_cb_coded_flag[x][y] may specify whether a transform block (hereinafter referred to as a "Cb transform block") of a Cb component with the coordinates of a top-left sample of (x, y) includes one or more non-zero transform coefficient levels. For example, tu_cb_coded_flag of a second value (e.g., 1) may specify that Cb transform block includes one or more non-zero transform coefficient levels. In addition, tu_cb_coded_flag of a first value (e.g., 0) may specify that the Cb transform block does not include one or more non-zero transform coefficient levels. When tu_cb_coded_flag is a first value, all transform coefficient levels in the Cb transform block may be set to 0. In addition, when tu_cb_coded_flag is not present in the bitstream, the value thereof may be inferred as a first value.

In the example shown in FIG. 8, tu_cr_coded_flag[x][y] may specify whether a transform block (hereinafter referred to as a "Cr transform block") of a Cr component with the coordinate of a top-left sample of (x, y) includes one or more non-zero transform coefficient levels. For example, tu_cr_coded_flag of a second value (e.g., 1) may specify that the Cr transform block includes one or more non-zero transform coefficient levels. In addition, tu_cr_coded_flag of a first value (e.g., 0) may specify that the Cr transform block does not include one or more non-zero transform coefficient levels. When tu_cr_coded_flag is a first value, all transform coefficient levels in the Cr transform block may be set to 0. In addition, when tu_cr_coded_flag is not present in the bitstream, the value thereof may be inferred as a first value.

In the example shown in FIG. 8, tu_y_coded_flag[x][y] may specify whether a transform block (hereinafter referred to as a "luma transform block") of a luma component with the coordinate of the top-left sample of (x, y) includes one or more non-zero transform coefficient levels. For example, tu_y_coded_flag of a second value (e.g., 1) may specify the luma transform block includes one or more non-zero transform coefficient levels. In addition, tu_y_coded_flag of a first value (e.g., 0) may specify that the luma transform block does not include one or more non-zero transform coefficient levels. When tu_y_coded_flag is a first value, all the transform coefficient levels in the luma transform block may be set to 0. When tu_y_coded_flag is not present in the bitstream, the value thereof may be inferred as a first value or a second value based on other various syntax elements and/or variables.

In the example shown in FIG. 8, tu_joint_cbcr_residual_flag[x][y] may specify whether a residual sample for the Cb component and a residual sample for the Cr component are coded as a single transform block, for the transform block with the coordinate of the top-left sample of (x, y). For example, when tu_joint_cbcr_residual_flag is a second value (e.g., 1), the transform unit may include transform coefficient levels for a single transform block, and residual samples for the Cb component and the Cr component may be derived from the single transform block. In addition, when tu_joint_cber_residual_flag is a first value (e.g., 0), transform coefficient levels for chroma components may be encoded/decoded as specified by tu_cb_coded_flag and tu_cr_coded_flag. For example, when tu_cb_coded_flag is 1, transform coefficient levels for the Cb transform block may be encoded/decoded, and, when tu_cb_coded_flag is 0, the transform coefficient levels for the Cb transform block may be inferred as 0 without being encoded/decoded. Similarly, when tu_cr_coded_flag is 1, the transform coefficient levels for the Cr transform block may be encoded/decoded and, when tu_cr_coded_flag is 0, the transform coefficient levels for the Cr transform block may be inferred as 0 without being encoded/decoded. When tu_joint_cbcr_residual_flag is not present in the bitstream, the value thereof may be inferred as a first value.

As shown in FIG. 8, transmission of residual information (transform_skip_flag, residual_coding( ) and/or residual_ts_coding( ) for each color component (luma (Y), chroma (Cb and Cr) may be determined based on various parameters and/or conditions. It is apparent from FIG. 8 that the signaling condition of the residual information is not limited to tu_y_coded_flag, tu_cb_coded_flag and tu_cr_coded_flag. However, in the present disclosure, as the signaling condition of the residual information, only tu_y_coded_flag, tu_cb_coded_flag, tu_cr_coded_flag and/or some conditions may be mentioned. This is for convenience of description and the signaling condition of the residual information is not limited thereto. That is, the signaling condition of the residual information may include all or some of the signaling conditions shown in FIG. 8 or may include additional signaling conditions which are not shown in FIG. 8. As shown in FIG. 8, for example, when tu_y_coded_flag is 1, residual information for the luma transform block may be signaled. Similarly, residual information for the Ch transform block and the Cr transform block may be signaled based on tu_cb_coded_flag and tu_cr_coded_flag.

However, as shown in FIG. 8, the residual information for the Cr transform block may be signaled only when the following condition is satisfied.

! (tu_cb_coded_flag && tu_joint_cbcr_residual_flag)

According to the above condition, when both tu_cb_coded_flag and tu_joint_cbcr_residual_flag are 1, the residual information for the Cr transform block is not signaled. That is, when both tu_cb_coded_flag and tu_joint_cbcr_residual_flag are 1, although tu_cr_coded_flag is 1, transform_skip_flag for the Cr component and residual syntax are not signaled. In this case, all the transform coefficient levels in the Cr transform block may be derived as 0.

In the above example, when tu_cb_coded_flag is 1, the Cb transform block includes at least one non-zero transform coefficient level and, although tu_cr_coded_flag is 1, all the transform coefficient levels in the Cr transform block may be derived as 0. Accordingly, based on determination of step S750, the boundary strength of the target boundary for the Cb component may be derived as 1 and the boundary strength of the target boundary for the Cr component may be derived as a value other than 1.

Accordingly, by application of joint CbCr residual coding, the following two problems may occur in the boundary strength determination process.

First, in step S750, although tu_cr_coded_flag is 1, the boundary strength of the target boundary for the Cr component may be derived as a value other than 1.

Second, although tu_cr_coded_flag is 0, when tu_joint_cbcr_flag is 1, the Cr transform block may include one or more non-zero transform coefficient levels. Nevertheless, in step S750, the boundary strength of the target boundary for the Cr component may be derived as a value other than 1.

Hereinafter, various embodiments of improving the embodiment of FIG. 7 by considering the above problems according to application of joint CbCr residual coding will be described.

Figure 9:
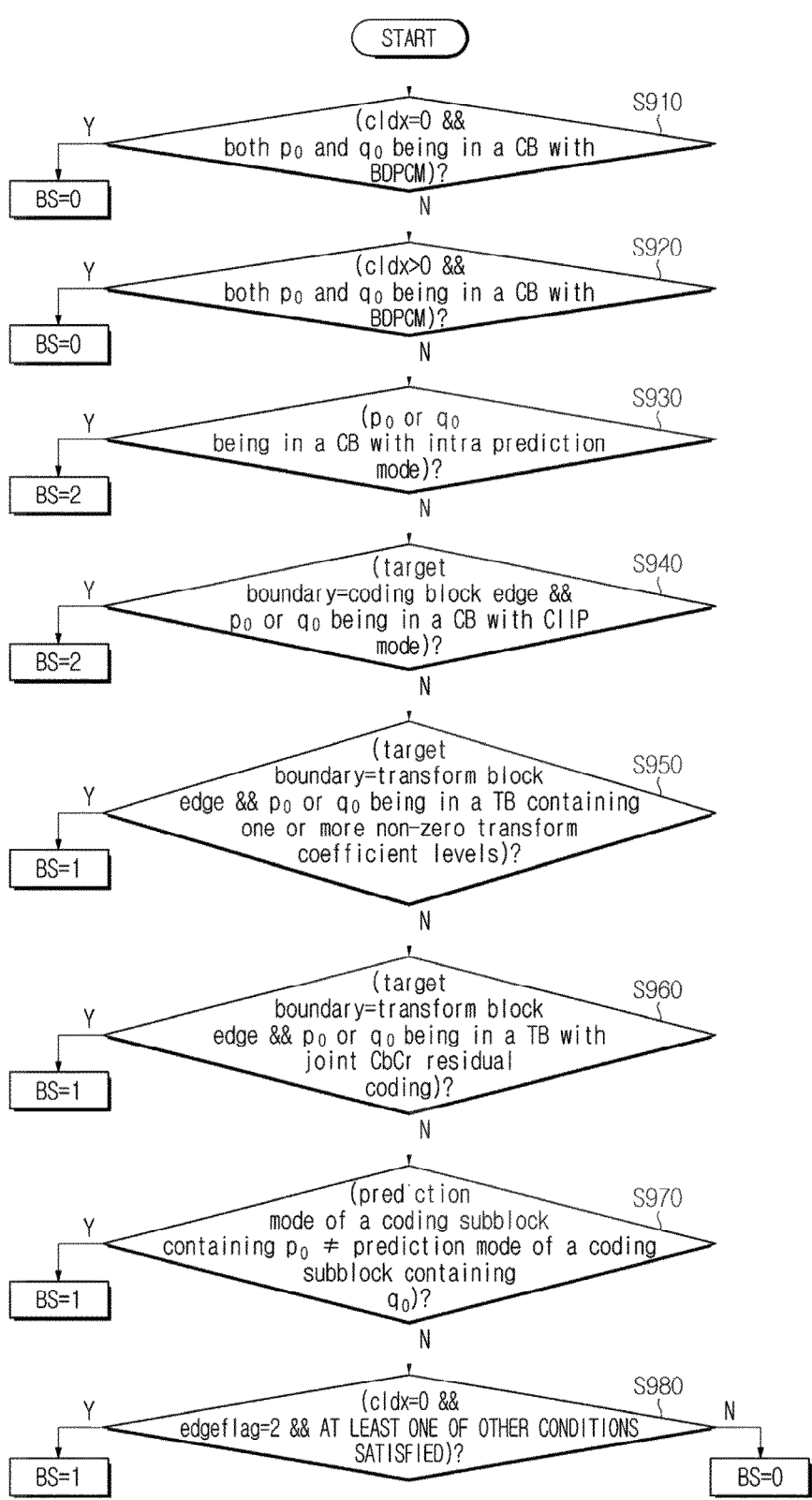
FIG. 9 is a flowchart illustrating a method of determining a boundary strength for a target boundary according to another embodiment of the present disclosure.

FIG. 9 is a flowchart illustrating a method of determining a boundary strength for a target boundary according to another embodiment of the present disclosure.

FIG. 9 is to improve the boundary strength determination method described with reference to FIG. 7 and the method of FIG. 7 and the method of FIG. 9 may be the same or overlap. In the method of FIG. 7 and the method of FIG. 9, a repeated description of the same or overlapping step may be omitted. For example, step S710 to S750 of FIG. 7 may correspond to steps S910 to S950 of FIG. 9, respectively. In addition, steps S760 to S770 of FIG. 7 may correspond to steps S970 to S980 of FIG. 9, respectively. A repeated description of the corresponding steps will be omitted. The boundary strength determination method according to FIG. 9 further includes step S960 compared to the method of FIG. 7.

Specifically, referring to FIG. 9, when the condition of step S950 is not satisfied (S950-No), step S960 may be determined. More specifically, whether the target boundary is a boundary of a transform block and at least one of two conditions described below is satisfied may be determined (S960). When the above condition is satisfied (S960-YES), the boundary strength for the corresponding target boundary may be determined to be a second value (e.g., 1).

Condition S960-1: The current block is a chroma Cb component block (e.g., cIdx=1) and the sample $p_0$ or the sample $q_0$ is included in a transform block (e.g., tu_joint_cbcr_residual_flag=1) on which joint CbCr residual coding is performed.

Condition S960-2: The current block is a chroma Cr component block (e.g., cIdx=2) and the sample $p_0$ or the sample $q_0$ is included in a transform block (e.g., tu_joint_cbcr_residual_flag=1) on which joint CbCr residual coding is performed.

Conditions S960-1 and S960-2 above may be merged into one condition, for example, as follows.

S960 merging condition: The current block is a chroma block (e.g., cIdx>0) and the sample $p_0$ or the sample $q_0$ is included in a transform block (e.g., tu_joint_cbcr_residual_flag=1) on which joint CbCr residual coding is performed.

A method of determining a boundary strength bS described with reference to FIG. 9 is exemplary and the boundary strength determination method according to the present disclosure is not limited to the example shown in FIG. 9. For example, some of the steps shown in FIG. 9 may be omitted and steps other than the steps shown in FIG. 9 may be added to any positions of the flowchart of FIG. 9. In addition, some of the steps shown in FIG. 9 may be performed simultaneously with the other steps or the order of steps may be changed.

For example, since tu_joint_cber_residual_flag may mean that at least one of tu_cu_coded_flag or tu_cr_coded_flag is 1, for the Cb transform block or the Cr transform block, it may be changed to omit step S950 in the boundary strength determination method according to FIG. 9.

According to the boundary strength determination method described with reference to FIG. 9, the above two problems which may occur by application of joint CbCr residual coding may be solved. That is, when joint CbCr residual coding is applied, the boundary strength of deblocking filtering for the transform block boundary may be determined to be a non-zero value (e.g., 1).

Figure 10:
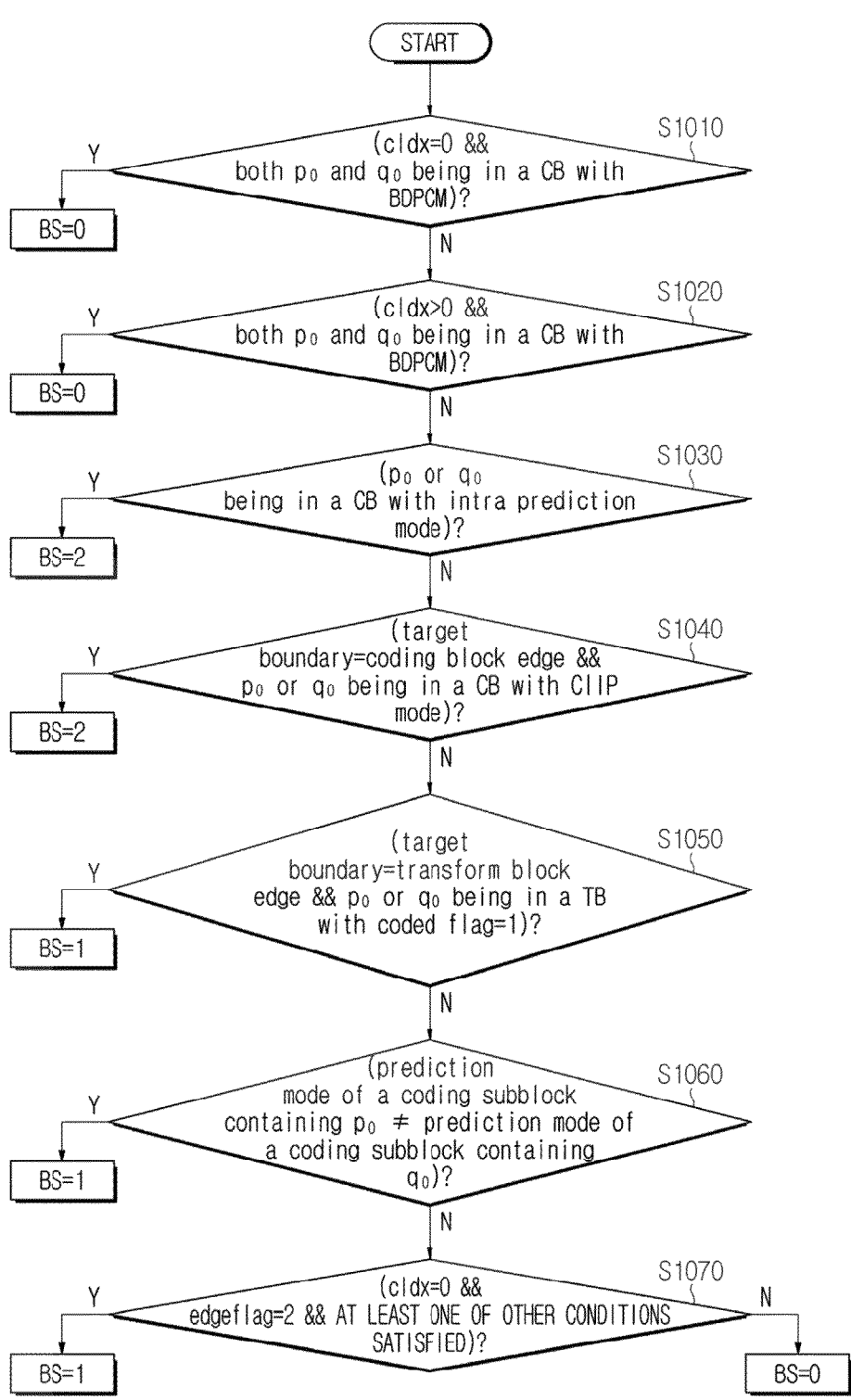
FIG. 10 is a flowchart illustrating a method of determining a boundary strength for a target boundary according to another embodiment of the present disclosure.

FIG. 10 is a flowchart illustrating a method of determining a boundary strength for a target boundary according to another embodiment of the present disclosure.

FIG. 10 is to improve the boundary strength determination method described with reference to FIG. 7 and the method of FIG. 7 and the method of FIG. 10 may be the same or overlap. In the method of FIG. 7 and the method of FIG. 10, a repeated description of the same or overlapping step may be omitted. For example, step S710 to S740 of FIG. 7 may correspond to steps S1010 to S1040 of FIG. 10, respectively. In addition, steps S760 to S770 of FIG. 7 may correspond to steps S1060 to S1070 of FIG. 10, respectively. A repeated description of the corresponding steps will be omitted. The boundary strength determination method according to FIG. 10 may further include step S1050 instead of step S750 compared to the method of FIG. 7.

Specifically, referring to FIG. 10, when the condition of step S1040 is not satisfied (S1040-No), step S1050 may be determined. Specifically, whether the target boundary is a boundary of a transform block and at least one of three conditions described below is satisfied may be determined (S1050). When the above condition is satisfied (S1050-YES), the boundary strength for the corresponding target boundary may be determined to be a second value (e.g., 1).

Condition S1050-1: A current block is a luma component block (e.g., cIdx=0) and the sample $p_0$ or the sample $q_0$ is included in a luma transform block (e.g., tu_y_coded_flag=1) including one or more non-zero transform coefficient levels.

Condition S1050-2: The current block is a chroma Cb component block (e.g., cIdx=1) and the sample $p_0$ or the sample $q_0$ is included in a Cb transform block (e.g., tu_cb_coded_flag=1) including one or more non-zero transform coefficient levels.

Condition S1050-3: The current block is a chroma Cr component block (e.g., cIdx=2) and the sample $p_0$ or the sample $q_0$ is included in a Cr transform block (e.g., tu_cr_coded_flag=1) including one or more non-zero transform coefficient levels.

A method of determining a boundary strength bS described with reference to FIG. 10 is exemplary and the boundary strength determination method according to the present disclosure is not limited to the example shown in FIG. 10. For example, some of the steps shown in FIG. 10 may be omitted and steps other than the steps shown in FIG. 10 may be added to any positions of the flowchart of FIG. 10. In addition, some of the steps shown in FIG. 10 may be performed simultaneously with the other steps or the order of the other steps may be changed.

According to the boundary strength determination method described with reference to FIG. 10, the above two problems which may occur by application of joint CbCr residual coding may be solved. That is, since the method of FIG. 10 determines whether the transform block includes one or more non-zero transform coefficient levels for each color component, even when joint CbCr residual coding is applied, the boundary strength of deblocking filtering for the transform block boundary may be accurately determined.

Figure 11:
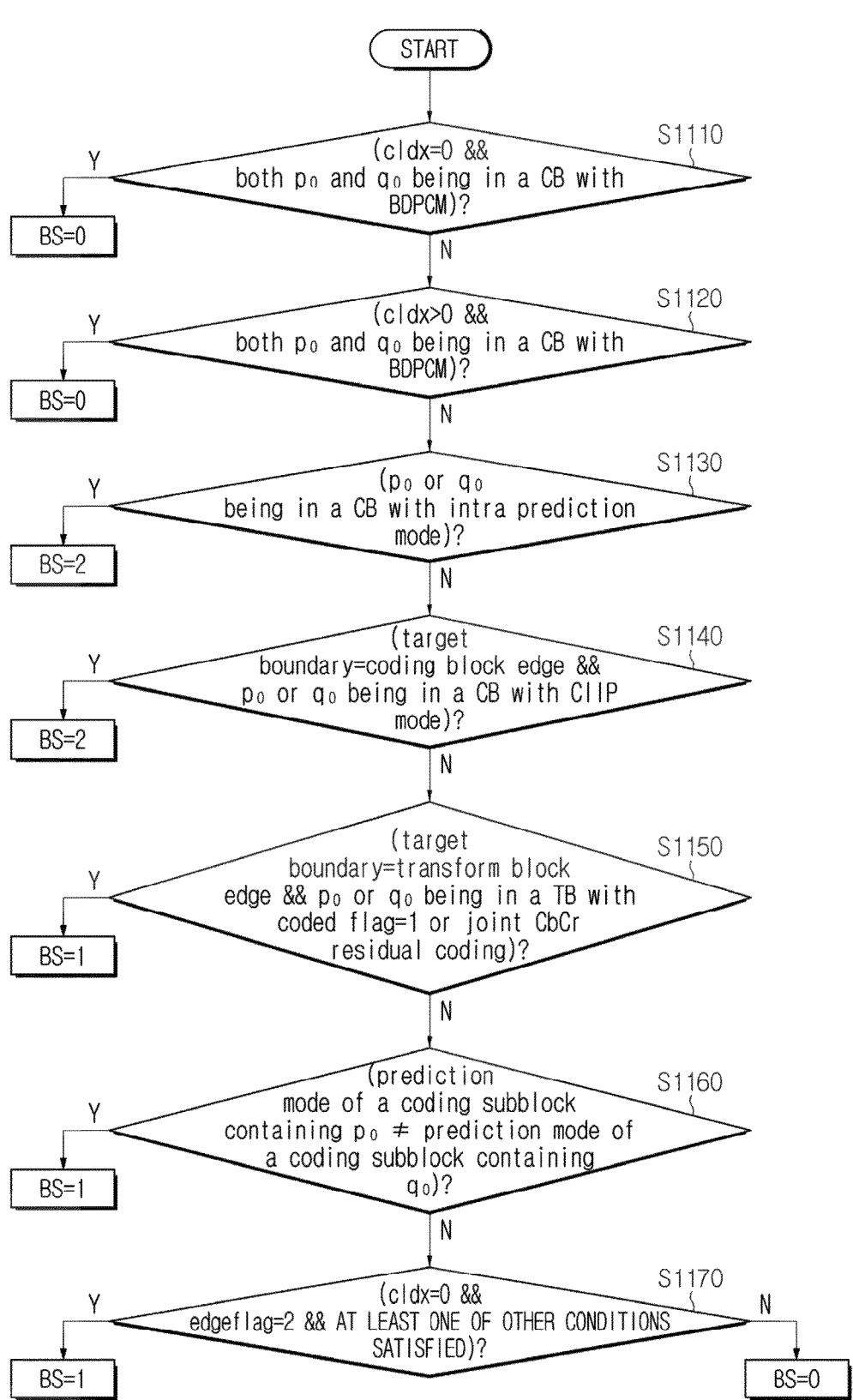
FIG. 11 is a flowchart illustrating a method of determining a boundary strength for a target boundary according to another embodiment of the present disclosure.

FIG. 11 is a flowchart illustrating a method of determining a boundary strength for a target boundary according to another embodiment of the present disclosure.

FIG. 11 is to improve the boundary strength determination method described with reference to FIG. 7 and the method of FIG. 7 and the method of FIG. 11 may be the same or overlap. In the method of FIG. 7 and the method of FIG. 11, a repeated description of the same or overlapping step may be omitted. For example, step S710 to S740 of FIG. 7 may correspond to steps S1110 to S1140 of FIG. 11, respectively. In addition, steps S760 to S770 of FIG. 7 may correspond to steps S1160 to S1170 of FIG. 11, respectively. A repeated description of the corresponding steps will be omitted. The boundary strength determination method according to FIG. 11 may further include step S1150 instead of step S750 compared to the method of FIG. 7.

Referring to FIG. 11, when the condition of step S1140 is not satisfied (S1140-No), step S1150 may be determined. Specifically, whether the target boundary is a boundary of a transform block and at least one of four conditions described blow is satisfied may be determined (S1150). When the above condition is satisfied (S1150-YES), the boundary strength for the corresponding target boundary may be determined to be a second value (e.g., 1).

Condition S1150-1: The current block is a luma component block (e.g., cIdx=0) and the sample $p_0$ or the sample $q_0$ is included in a luma transform block (e.g. tu_y_coded_flag=1) including one or more transform coefficient levels.

Condition S1150-2: The current block is a chroma Cb component block (e.g., cIdx=1) and the sample $p_0$ or the sample $q_0$ is included in a Cb transform block (e.g., tu_cb_coded_flag=1) including one or more non-zero transform coefficient levels.

Condition S1150-3: The current block is a chroma Cr component block (e.g., cIdx=2) and the sample $p_0$ or the sample $q_0$ is included in a Cr transform block (e.g., tu_cr_coded_flag=1) including one or more non-zero transform coefficient levels.

Condition S1150-4: The current block is not a luma component block (e.g., cIdx #0) and the sample $p_0$ or the sample $q_0$ is included in a transform block (e.g., tu_joint_cbcr_residual_flag=1) on which joint CbCr residual coding is performed.

A method of determining a boundary strength bS described with reference to FIG. 11 is exemplary and the boundary strength determination method according to the present disclosure is not limited to the example shown in FIG. 11. For example, some of the steps shown in FIG. 11 may be omitted and steps other than the steps shown in FIG. 11 may be added to any positions of the flowchart of FIG. 11. In addition, some of the steps shown in FIG. 11 may be performed simultaneously with the other steps or the order of steps may be changed.

According to the boundary strength determination method described with reference to FIG. 11, the above two problems which may occur by application of joint CbCr residual coding may be solved. That is, since the method of FIG. 11 determines whether the transform block includes one or more non-zero transform coefficient levels for each color component, even when joint CbCr residual coding is applied, the boundary strength of deblocking filtering for the transform block boundary may be accurately determined. In addition, according to the method of FIG. 11, when joint CbCr residual coding is applied, the boundary strength of deblocking filtering for the transform block boundary may be determined to be a non-zero value (e.g., 1).

In the embodiments described with reference to FIGS. 7 to 11, determination of the boundary strength based on determination of whether the transform block includes one or more non-zero transform coefficient levels by considering application of joint CbCr residual coding may be variously changed.

For example, as described above, when joint CbCr residual coding is applied for at least one of two blocks (P block and Q block) adjacent to the target boundary (tu_joint_cbcr_residual_flag is 1), the boundary strength may be determined to be a second value (e.g., 1). In addition, when at least one of two blocks (P block and Q block) adjacent to the target boundary includes a non-zero transform coefficient level (the coded flag of the corresponding color component is 1), the boundary strength may be determined to be a second value (e.g., 1).

Accordingly, according to another embodiment of the present disclosure, the condition of step S750 may be changed as follows.

For the luma component (e.g., cIdx=0), when a sum of a value of tu_y_coded_flag for the P block and a value of tu_y_coded_flag for the Q block is greater than 0, the corresponding boundary strength may be determined to be a second value (e.g., 1).

For the Cb component (e.g., cIdx=1), when a sum of a value of tu_cb_coded_flag for the P block, a value of tu_joint_cbcr_residual_flag, a value of tu_cb_coded_flag for the Q block and a value of tu_joint_cbcr_residual_flag is greater than 0, the corresponding boundary strength may be determined to be a second value (e.g., 1).

For the Cr component (e.g., cIdx=2), when a sum of a value of tu_cr_coded_flag for the P block, a value of tu_joint_cher_residual_flag, a value of tu_cr_coded_flag for the Q block and a value of tu_joint_cbcr_residual_flag is greater than 0, the corresponding boundary strength may be determined to be a second value (e.g., 1).

As described above, according to the changed example, when at least one of the P block or the Q block includes a non-zero transform coefficient level or joint CbCr residual coding is applied for at least one of the P block or the Q block, the corresponding boundary strength may be determined to be a second value (e.g., 1).

Figure 12:
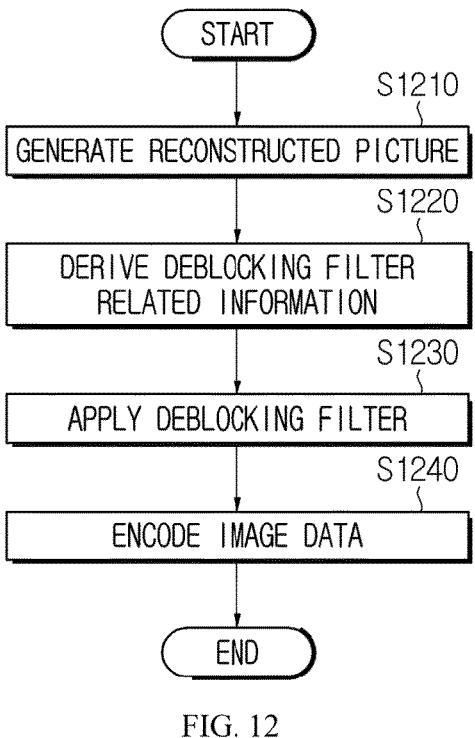
FIG. 12 is a flowchart illustrating an encoding process based on deblocking filtering according to the present disclosure.

FIG. 12 is a flowchart illustrating an encoding process based on deblocking filtering according to the present disclosure.

Referring to FIG. 12, the image encoding apparatus may generate a reconstructed picture (S1210). The image encoding apparatus may generate the reconstructed picture by encoding an input image to be encoded and reconstructing it.

The image encoding apparatus may derive deblocking filter related information for the reconstructed picture (S1220).

As described above, the deblocking filter related information may include a flag specifying whether a deblocking filter is available. In addition, the deblocking filter related information may include various information used to derive the boundary strength. The boundary strength may be differently derived according to the luma component (Y) and the chroma components (cb, cr). The target boundary to which deblocking filtering is applied may be individually derived according to the luma component (Y) and the chroma components (cb, cr).

The image encoding apparatus may generate a modified reconstructed picture by applying deblocking filtering for the reconstructed picture based on the derived deblocking filter related information (S1230). The modified reconstructed picture may be transmitted to the memory 170 and may be used as a reference picture in the inter prediction unit 180. A DPB in the memory 170 may store the modified reconstructed picture for use as a reference picture for inter prediction.

The image encoding apparatus may encode image data including the deblocking filter related information (S1240). For example, the deblocking filter related information may be transmitted to the entropy encoder 190 and encoded by the entropy encoder 190, thereby being output in the form of a bitstream.

Figure 13:
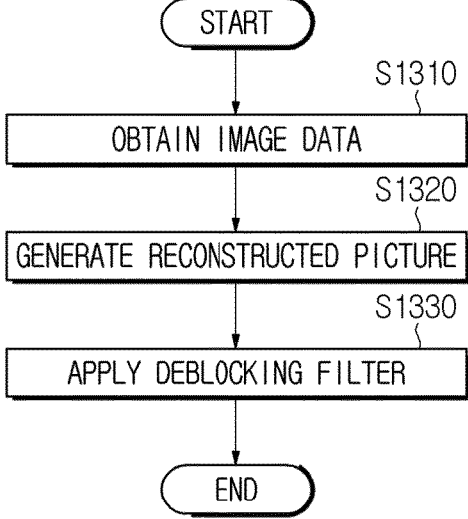
FIG. 13 is a flowchart illustrating a decoding process based on deblocking filtering according to the present disclosure.

FIG. 13 is a flowchart illustrating a decoding process based on deblocking filtering according to the present disclosure.

Referring to FIG. 13, an image decoding apparatus may obtain image data including the deblocking filter related information from a bitstream (S1310).

The image decoding apparatus 200 of FIG. 3 may receive the signal output from the image encoding apparatus 100 of FIG. 2 in the form of a bitstream. The entropy decoder 210 may obtain information (e.g., video/image information) necessary for image reconstruction (or picture reconstruction) by parsing the bitstream.

The image decoding apparatus may generate a reconstructed picture based on the obtained image information (S1320).

For example, the adder 235 of the image decoding apparatus 200 of FIG. 3 may generate the reconstructed picture by adding the obtained residual signal to a prediction signal (predicted block, a prediction sample array) output from a prediction unit (inter prediction unit 260 and/or the intra prediction unit 265).

The image decoding apparatus may generate a modified reconstructed picture by applying deblocking filtering for the reconstructed picture (S1330).

The filter 240 of the image decoding apparatus 200 of FIG. 3 may improve subjective/objective image quality by applying filtering to the reconstructed picture. For example, the filter 240 may generate a modified reconstructed picture by applying various filtering methods to the reconstructed picture. The modified reconstructed picture may be stored in the memory 250, specifically, the DPB of the memory 250. The (modified) reconstructed picture stored in the DPB of the memory 250 may be used as a reference picture in the inter prediction unit 260.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some steps.

In the present disclosure, the image encoding apparatus or the image decoding apparatus that performs a predetermined operation (step) may perform an operation (step) of confirming an execution condition or situation of the corresponding operation (step). For example, in case it is described that predetermined operation is performed when a predetermined condition is satisfied, the image encoding apparatus or the image decoding apparatus may perform the predetermined operation after determining whether the predetermined condition is satisfied.

The various embodiments of the present disclosure are not a list of all possible combinations and are intended to describe representative aspects of the present disclosure, and the matters described in the various embodiments may be applied independently or in combination of two or more.

Various embodiments of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

In addition, the image decoding apparatus and the image encoding apparatus, to which the embodiments of the present disclosure are applied, may be included in a multimedia broadcasting transmission and reception device, a mobile communication terminal, a home cinema video device, a digital cinema video device, a surveillance camera, a video chat device, a real time communication device such as video communication, a mobile streaming device, a storage medium, a camcorder, a video on demand (VOD) service providing device, an OTT video (over the top video) device, an Internet streaming service providing device, a three-dimensional (3D) video device, a video telephony video device, a medical video device, and the like, and may be used to process video signals or data signals. For example, the OTT video devices may include a game console, a blu-ray player, an Internet access TV, a home theater system, a smartphone, a tablet PC, a digital video recorder (DVR), or the like.

Figure 15:
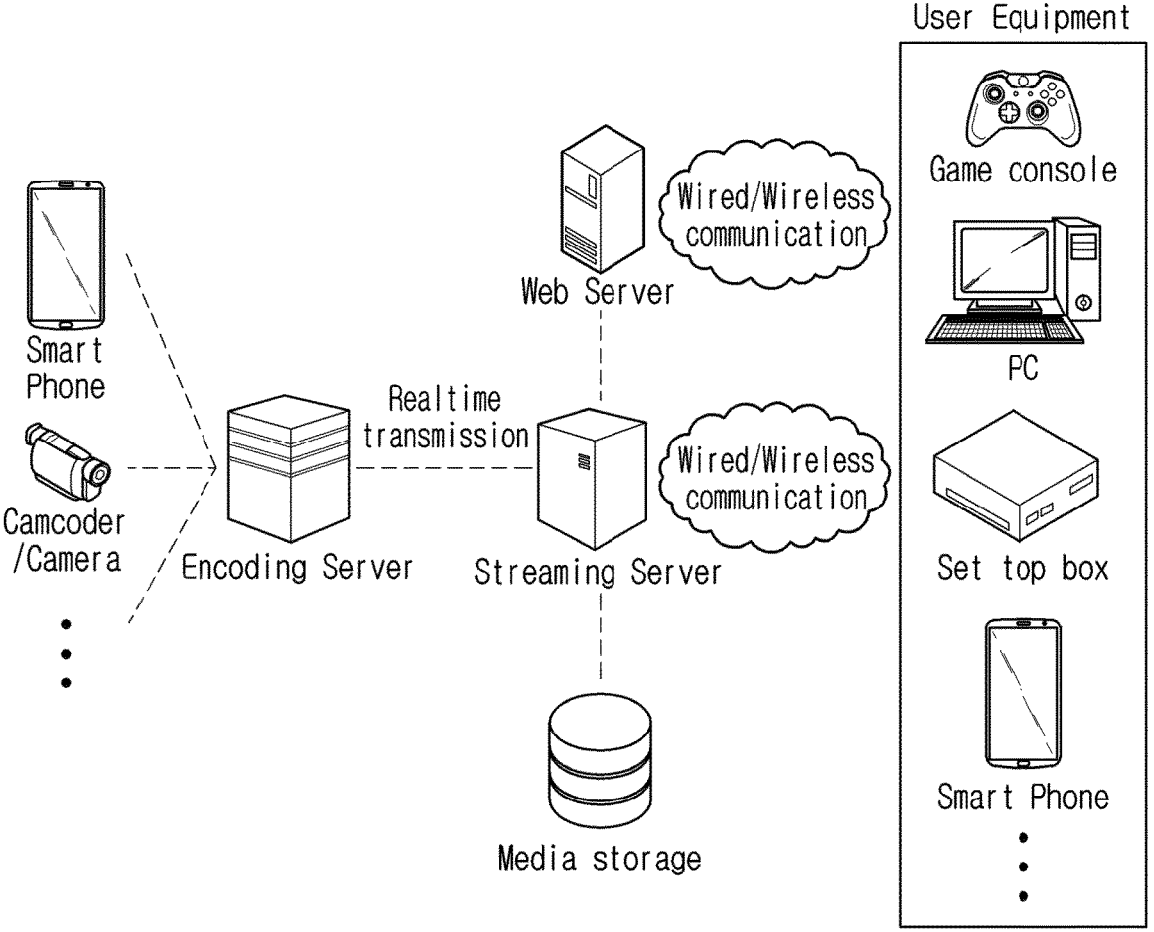
FIG. 15 is a view showing a content streaming system, to which an embodiment of the present disclosure is applicable.

FIG. 15 is a view showing a content streaming system, to which an embodiment of the present disclosure is applicable.

As shown in FIG. 15, the content streaming system, to which the embodiment of the present disclosure is applied, may largely include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the content streaming system may include a separate control server. In this case, the control server serves to control a command/response between devices in the content streaming system.

The streaming server may receive content from a media storage and/or an encoding server. For example, when the content are received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the content streaming system may be operated as a distributed server, in which case data received from each server may be distributed.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

INDUSTRIAL APPLICABILITY

The embodiments of the present disclosure may be used to encode or decode an image.

What is claimed is:

1. An image decoding method performed by an image decoding apparatus, the image decoding method comprising:

obtaining, from a bitstream, a first flag specifying whether joint CbCr residual coding is performed on a first block adjacent a target boundary of deblocking filtering, a second flag specifying whether joint CbCr residual coding is performed on a second block adjacent the target boundary, a third flag specifying whether the first block includes a non-zero transform coefficient level, and a fourth flag specifying whether the second block includes a non-zero transform coefficient level;

obtaining a reconstructed picture;

determining the target boundary in the reconstructed picture;

determining a boundary strength for the target boundary; and applying deblocking filtering to the target boundary based on the boundary strength, wherein based on the target boundary being a transform block boundary and a color component of the reconstructed picture being a chroma component, the boundary strength is determined based on the first flag, the second flag, the third flag, and the fourth flag.

2. The image decoding method of claim 1, wherein the boundary strength is determined to be 1, based on a sum of the first flag, the second flag, the third flag, and the fourth flag being greater than 0.

3. The image decoding method of claim 1, wherein based on the target boundary being a transform block boundary and the color component of the reconstructed picture being a luma component, the boundary strength is determined based on whether at least one of the first block and the second block includes a non-zero transform coefficient level.

4. The image decoding method of claim 1, wherein the joint CbCr residual coding corresponds to coding residual samples for a chroma Cb component and a chroma Cr component as a single transform block.

5. An image encoding method performed by an image encoding apparatus, the image encoding method comprising:

generating a reconstructed picture;

determining a target boundary in the reconstructed picture;

determining a boundary strength for the target boundary; and applying deblocking filtering to the target boundary based on the boundary strength, wherein based on the target boundary being a transform block boundary and a color component of the reconstructed picture being a chroma component, the boundary strength is determined based on a first flag specifying whether joint CbCr residual coding is performed on a first block adjacent the target boundary, a second flag specifying whether joint CbCr residual coding is performed on a second block adjacent the target boundary, a third flag specifying whether the first block includes a non-zero transform coefficient level, and a fourth flag specifying whether the second block includes a non-zero transform coefficient level, and wherein the first flag, the second flag, the third flag, and the fourth flag are encoded in a bitstream.

6. The image encoding method of claim 5, wherein the boundary strength is determined to be 1, based on a sum of the first flag, the second flag, the third flag, and the fourth flag being greater than 0.

7. The image encoding method of claim 5, wherein based on the target boundary being a transform block boundary and the color component of the reconstructed picture being a luma component, the boundary strength is determined based on whether at least one of the first block and the second block includes a non-zero transform coefficient level.

8. The image encoding method of claim 5, wherein the joint CbCr residual coding corresponds to coding residual samples for a chroma Cb component and a chroma Cr component as a single transform block.

9. An image decoding apparatus comprising at least one processor and a memory storing instructions which, when executed by the at least one processor, cause the image decoding apparatus to:

obtain, from a bitstream, a first flag specifying whether joint CbCr residual coding is performed on a first block adjacent a target boundary of deblocking filtering, a second flag specifying whether joint CbCr residual coding is performed on a second block adjacent the target boundary, a third flag specifying whether the first block includes a non-zero transform coefficient level, and a fourth flag specifying whether the second block includes a non-zero transform coefficient level;

obtain a reconstructed picture;

determine the target boundary in the reconstructed picture;

determine a boundary strength for the target boundary; and apply deblocking filtering to the target boundary based on the boundary strength, wherein, based on the target boundary being a transform block boundary and a color component of the reconstructed picture being a chroma component, the boundary strength is determined based on the first flag, the second flag, the third flag, and the fourth flag.

10. The image decoding apparatus of claim 9, wherein the boundary strength is determined to be 1, based on a sum of the first flag, the second flag, the third flag, and the fourth flag being greater than 0.

11. The image decoding apparatus of claim 9, wherein based on the target boundary being a transform block boundary and the color component of the reconstructed picture being a luma component, the boundary strength is determined based on whether at least one of the first block and the second block includes a non-zero transform coefficient level.

12. The image decoding apparatus of claim 9, wherein the joint CbCr residual coding corresponds to coding residual samples for a chroma Cb component and a chroma Cr component as a single transform block.

13. An image encoding apparatus comprising at least one processor and a memory storing instructions which, when executed by the at least one processor, cause the image encoding apparatus to perform the image encoding method of claim 5.

14. A non-transitory computer-readable storage medium storing a bitstream and a computer program, wherein when executed by a processor, the computer program enables the processor to generate the bitstream according to the image encoding method of claim 5.

* * * * *